United States Patent [19]

Nobuta

[11] Patent Number: 4,970,599
[45] Date of Patent: Nov. 13, 1990

[54] IMAGE PROCESSING APPARATUS WITH PLURAL PAGE MEMORY AND ERROR DETECTION

[75] Inventor: Hiroshi Nobuta, Yokohama, Japan

[73] Assignee: Canon Kabushiki Kaisha, Tokyo, Japan

[21] Appl. No.: 289,511

[22] Filed: Dec. 27, 1988

Related U.S. Application Data

[63] Continuation of Ser. No. 777,718, Sep. 19, 1985, abandoned.

[30] Foreign Application Priority Data

| Sep. 28, 1984 | [JP] | Japan | 59-201898 |
| Sep. 28, 1984 | [JP] | Japan | 59-201899 |
| Oct. 2, 1984 | [JP] | Japan | 59-205627 |
| Oct. 2, 1984 | [JP] | Japan | 205628 |
| Oct. 2, 1984 | [JP] | Japan | 59-205629 |

[51] Int. Cl.$^5$ .................. G01D 15/16; H04N 1/21
[52] U.S. Cl. .................................................. 358/296
[58] Field of Search ............... 346/76 L, 107 R, 108, 346/160; 358/296, 300, 302

[56] References Cited

U.S. PATENT DOCUMENTS

| 3,889,054 | 6/1975 | Nagel et al. | 358/83 |
| 4,544,956 | 10/1985 | Shimizu | 358/296 |
| 4,591,921 | 5/1986 | Nakajima | 358/296 |

FOREIGN PATENT DOCUMENTS

| 57-38056 | 3/1982 | Japan | 358/296 |
| 58-63267 | 4/1983 | Japan | 358/296 |
| 58-75956 | 5/1983 | Japan | 358/296 |
| 58-104566 | 6/1983 | Japan | 358/296 |
| 58-147271 | 9/1983 | Japan | 358/296 |

*Primary Examiner*—Mark J. Reinhart
*Attorney, Agent, or Firm*—Fitzpatrick, Cella, Harper & Scinto

[57] ABSTRACT

An image processing apparatus, capable of storing and outputting image data, comprises a printer to print the read image; an image memory to store the received image data during the operation of the printer; and a checking device for decoding the received image data on the basis of a predetermined conversion processing system and detecting the presence or absence of an error of the image data, wherein after completion of the operation of the printer, the image data stored in the memory is read out and the checking device is made operative. With this apparatus, the copying and communicating operations can be simultaneously performed even if no recording paper is set. Even when a paper jam occurs, the reception of the image data is continued and after the recovery of the jam, the number of residual pages which are not recorded among the received image data may be displayed.

28 Claims, 27 Drawing Sheets

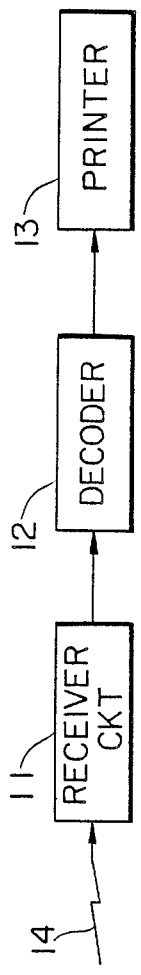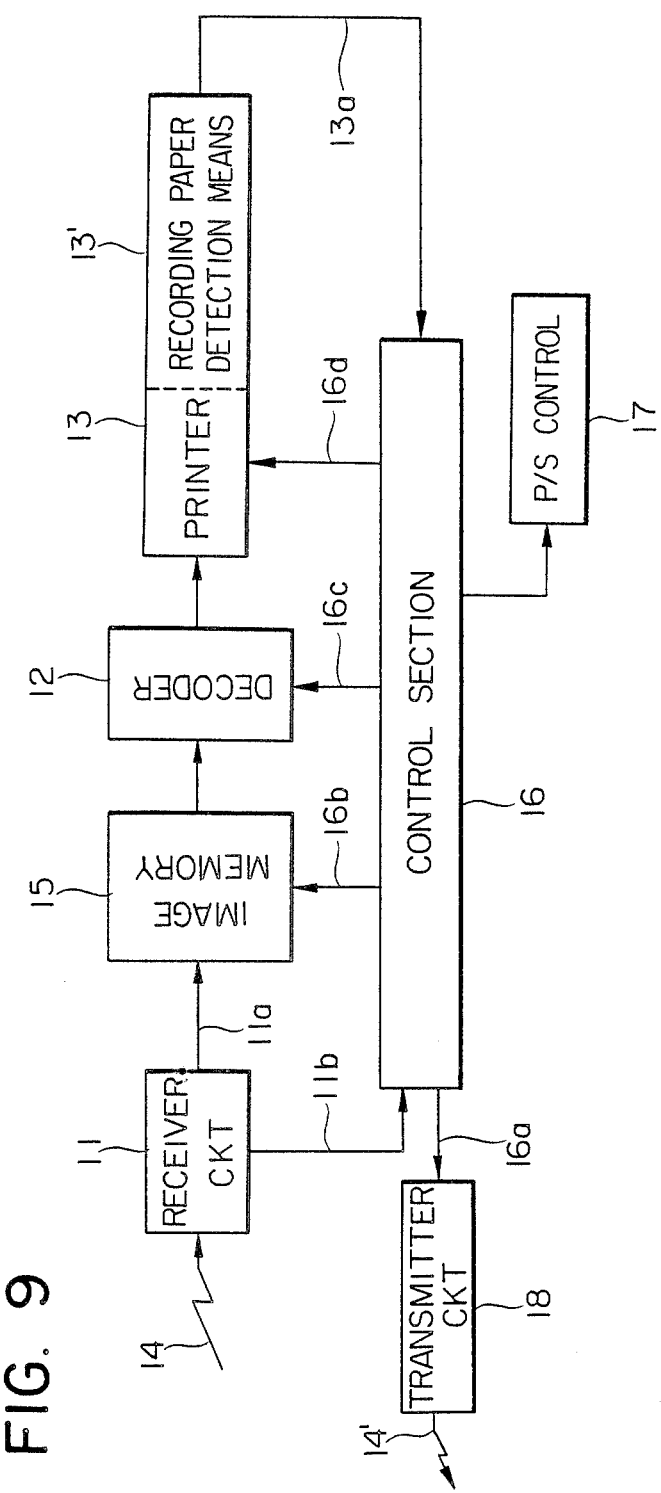
FIG. 8 PRIOR ART
FIG. 9

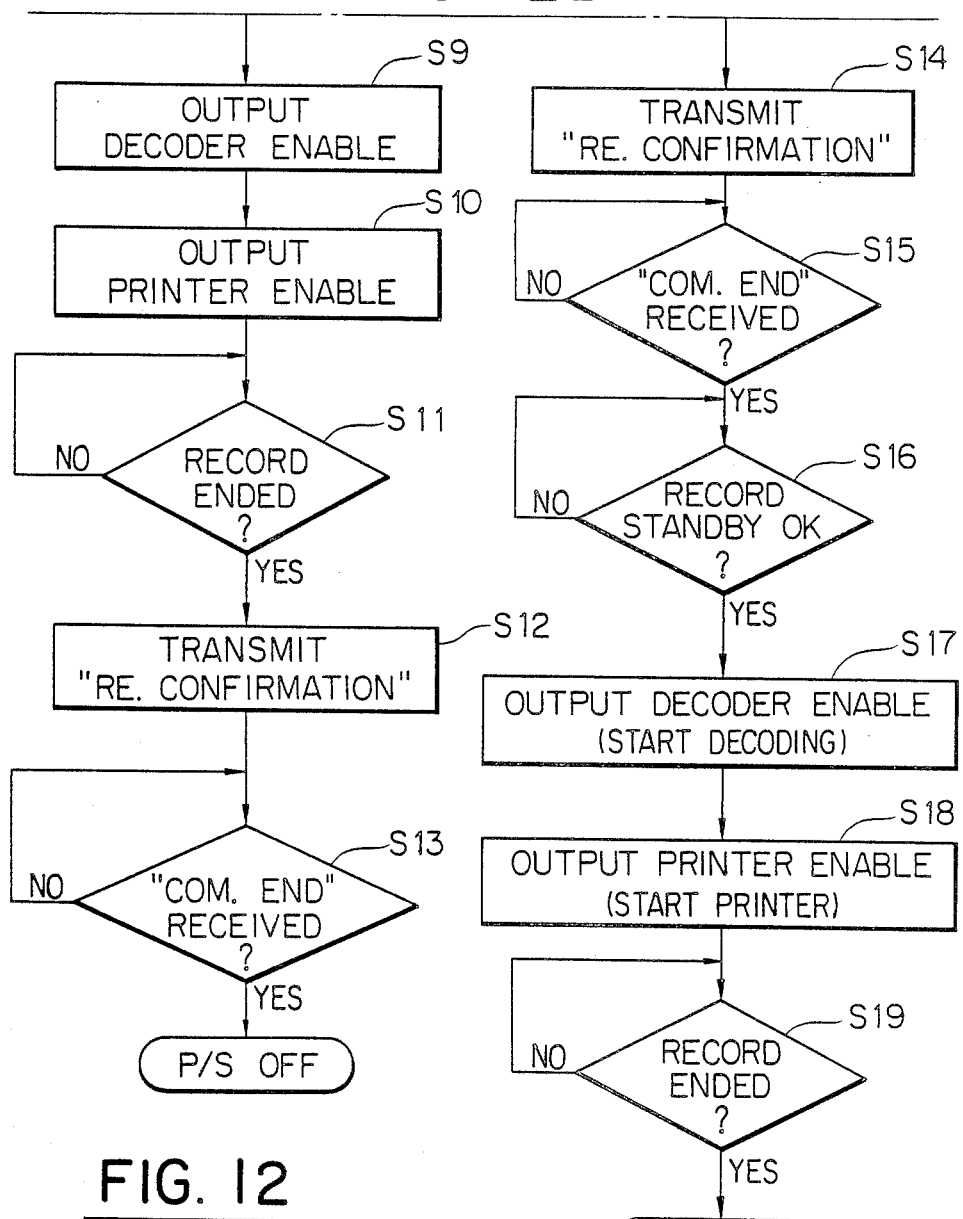

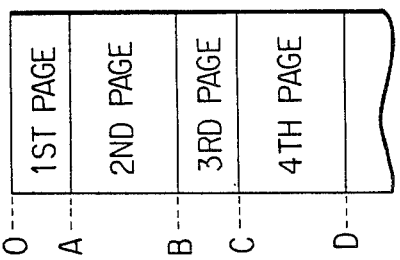
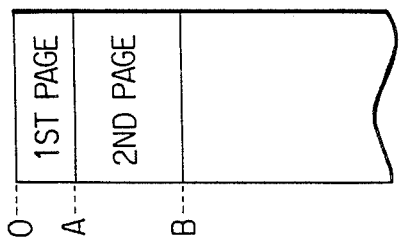
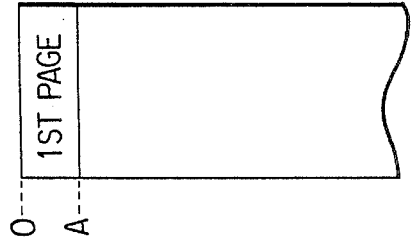
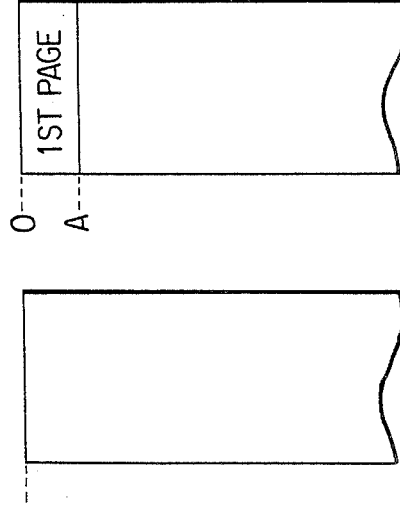
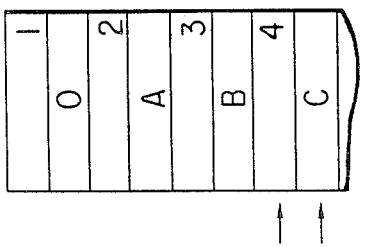
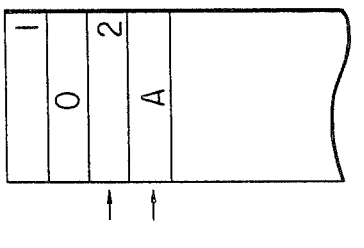
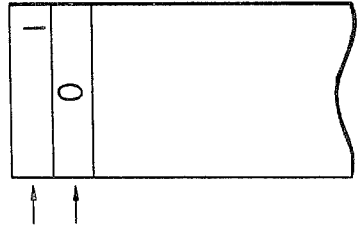
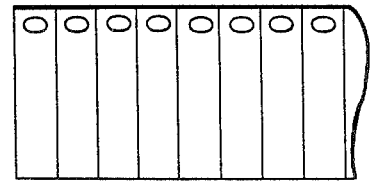

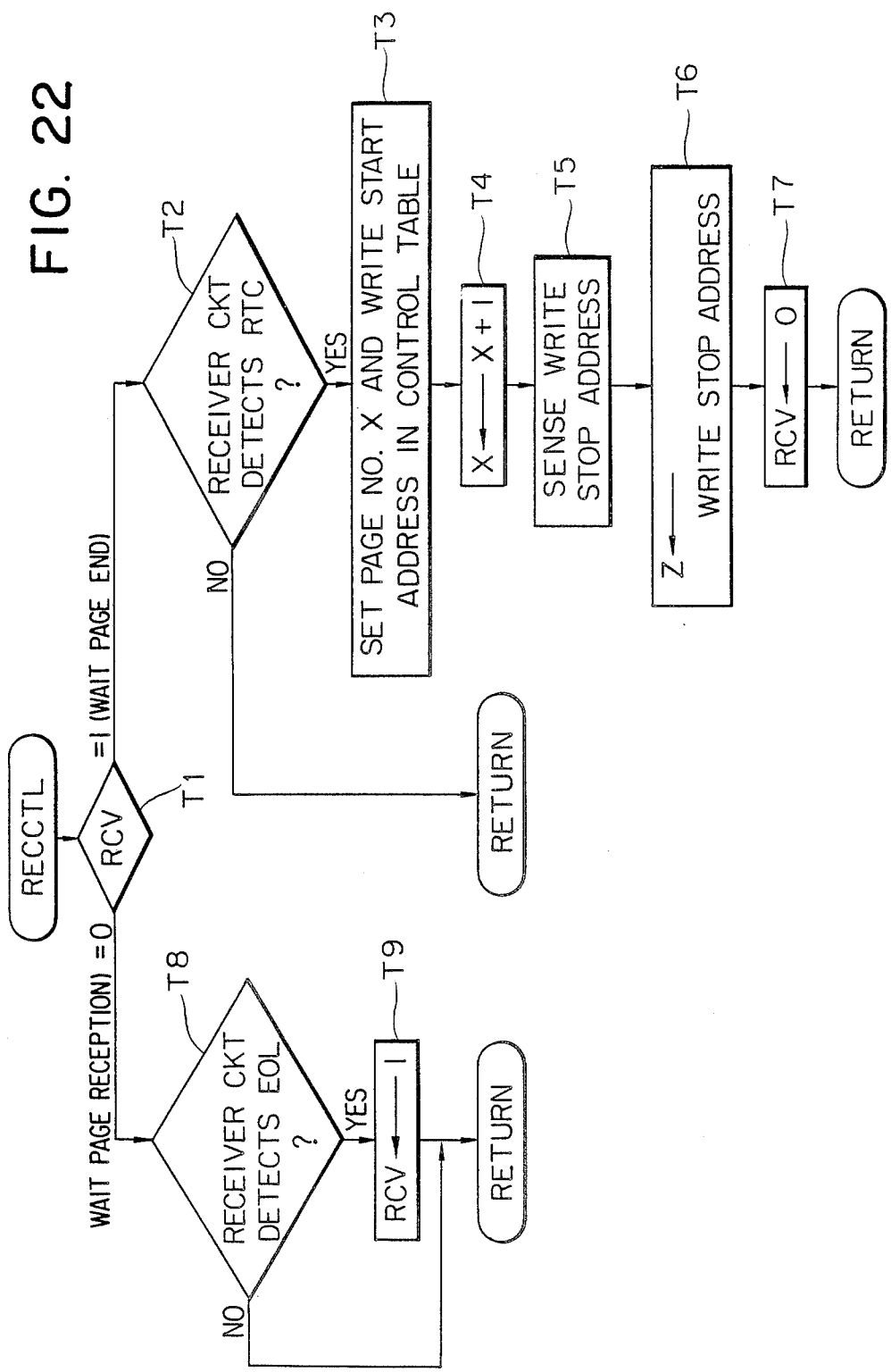

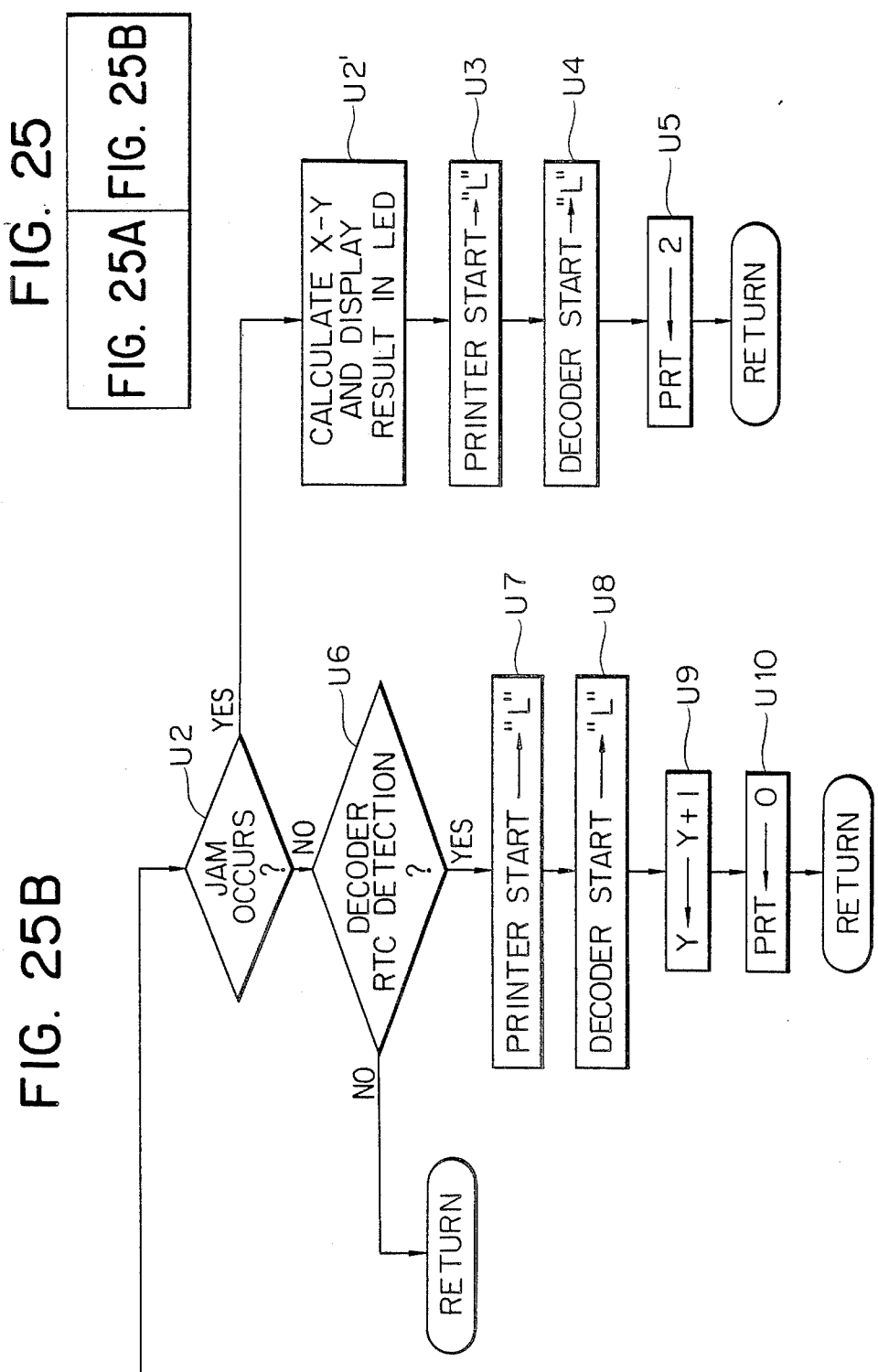

IMAGE PROCESSING APPARATUS WITH PLURAL PAGE MEMORY AND ERROR DETECTION

This application is a continuation of application Ser. No. 777,718 filed 9/19/85 now abandoned.

BACKGROUND OF THE INVENTION

1. Field of the Invention

The present invention relates to an image processing apparatus having a function to store image data and a function to output the image data.

2. Description of the Prior Art

Such apparatus, hitherto, has included known facsimile apparatuses having a copy function or recording apparatuses of various kinds which can communicate with a host system or terminals.

Generally, such conventional apparatuses are constituted as shown in FIG. 1. In the apparatus shown in the diagram, an image of an original 1A is read by photoelectric converting means 1B such as a CCD sensor or the like, and either the image signal digitized by a binarization circuit 2 by way of a predetermined threshold value or the image signal returned as a binarized signal by a receiver circuit 5 and a decoder 6 through a line 7 is outputted to a printer 4 through an OR gate 3 in a real time manner.

Therefore, this kind of conventional apparatus has a drawback such that a communication cannot be performed through the line 7 during the copying operation.

On the other hand, recent facsimile apparatuses, have been provided with means for temporarily storing image signals representing more than one page of a standard document during the communicating operation in association with an increase in quantity of image signals which are transmitted or a reduction in costs of memory devices or in order to make the communication faster. With this apparatus, image data can be also received during the copying operation. However, in such an apparatus, no check is made to see if there is an error such as a transmission mistake or the like in the image data received and stored in the memory. Thus, there is a drawback such that erroneous data can be printed in the case where the received data is printed after completion of a copying operation.

In addition, in the early conventional facsimile apparatuses, transmission speed was low and the image signal included a relatively small quantity of data which is transmitted and received. Therefore, as shown in FIG. 8, the data received through a receiver circuit 11 from a communication line 14 such as a telephone line or the like is decoded in a real time manner through a decoder 12 by way of a decoding method in accordance with a predetermined coding system. The decoded result is recorded by way of a printer 13 such as a thermal recording apparatus, an ink jet recording apparatus, or the like. In such an arrangement, the image data received is always recorded by the printer 13, so that the receiving operation cannot be performed if no recording paper is set in the printer. Therefore, a facsimile apparatus having an image memory is considered. However, it is the present situation that image memories are mainly used to respectively coordinate the communicating speeds, decoding speeds of the decoder, and further the recording speeds of the recording output means, and they are not used as memories such that all of the image data received are preliminarily stored in the image memory such that this image data is recorded and outputted at a proper timing.

SUMMARY OF THE INVENTION

It is an object of the present invention to eliminate the above-mentioned drawbacks.

Another object of the invention is to improve an image processing apparatus.

Still another object of the invention is to provide an image processing apparatus in which the copying operation and the communicating operation are simultaneously executed by a simple cheap arrangement and also the use efficiency of the line is not lost.

Still another object of the invention is to provide an image processing apparatus which can perform the communicating operation by a simple cheap arrangement even if no recording paper is set.

Still another object of the invention is to provide an image processing apparatus which can automatically record and reproduce at the time when the jam of the recording papers is recovered.

Still another object of the invention is to provide an image processing apparatus in which even if the jam of the recording papers occurs, the reception of image data is continued without interrupting the reception of the image data and after the paper jam was recovered, it is possible to display the number of pages of the images which are not recorded nor reproduced although the reception of the image data has been completed.

Other objects and features of the present invention will become apparent from the following detailed description and the appended claims with reference to the accompanying drawings.

BRIEF DESCRIPTION OF THE DRAWINGS

FIG. 8 is a block diagram showing a fundamental arrangement of a conventional image processing apparatus;

FIG. 9 is a block diagram showing an arrangement of a facsimile apparatus to which the present invention is applied;

FIGS. 12, 12A and 12B are a flowchart showing the processing procedure of the control section which makes it possible to perform the procedure shown in FIG. 11;

FIGS. 14 to 23 are diagrams to explain an embodiment of the present invention, in which:

FIG. 14 is a block diagram of a control circuit;

FIG. 15 is an explanatory diagram showing the relationship among the received data, the image accumulation range in the memory, and the head address of each page;

FIG. 16 is an explanatory diagram of an accumulation control table;

FIGS. 17-(A) to 17-(D) and 18-(A) to 18-(D) are explanatory diagrams showing the accumulation states of the respective pages and head addresses in the memory and the write states in the accumulation control table;

FIG. 19 is a timing chart of each signal in the state whereby no jam occurs;

FIG. 20 is a timing chart of each signal when the jam occurs;

FIG. 21 is a flowchart to explain the overall control;

FIG. 22 is a flowchart to explain the record control;

FIGS. 23, 23A and 23B are a flowchart to explain the print control;

FIGS. 24 to 26 are diagrams to explain another embodiment of the present invention, in which:

FIG. 24 is a block diagram of a control circuit;

FIGS. 25, 25A and 25B are a flowchart to explain the print control; and

FIG. 26 is a timing chart of each signal.

DETAILED DESCRIPTION OF THE PREFERRED EMBODIMENTS

One embodiment of the present invention will now be described hereinbelow with reference to the drawings.

Figure 1:
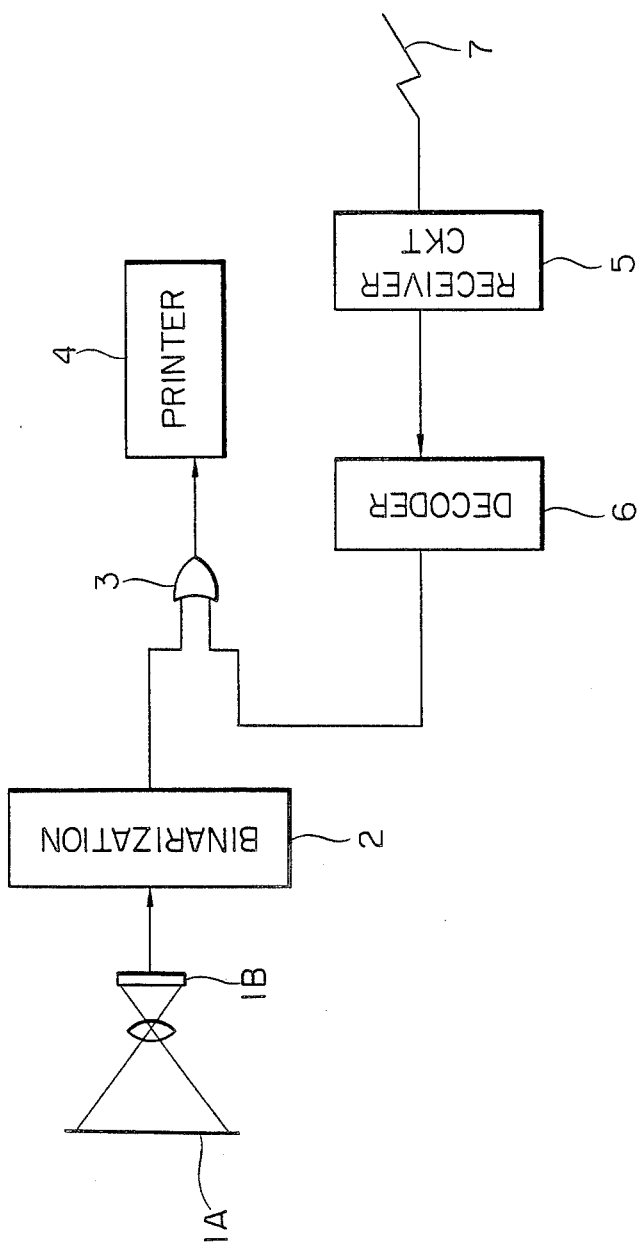
FIG. 1 is a block diagram showing a fundamental arrangement of a conventional image processing apparatus having the copy and communication functions.
Figure 2:
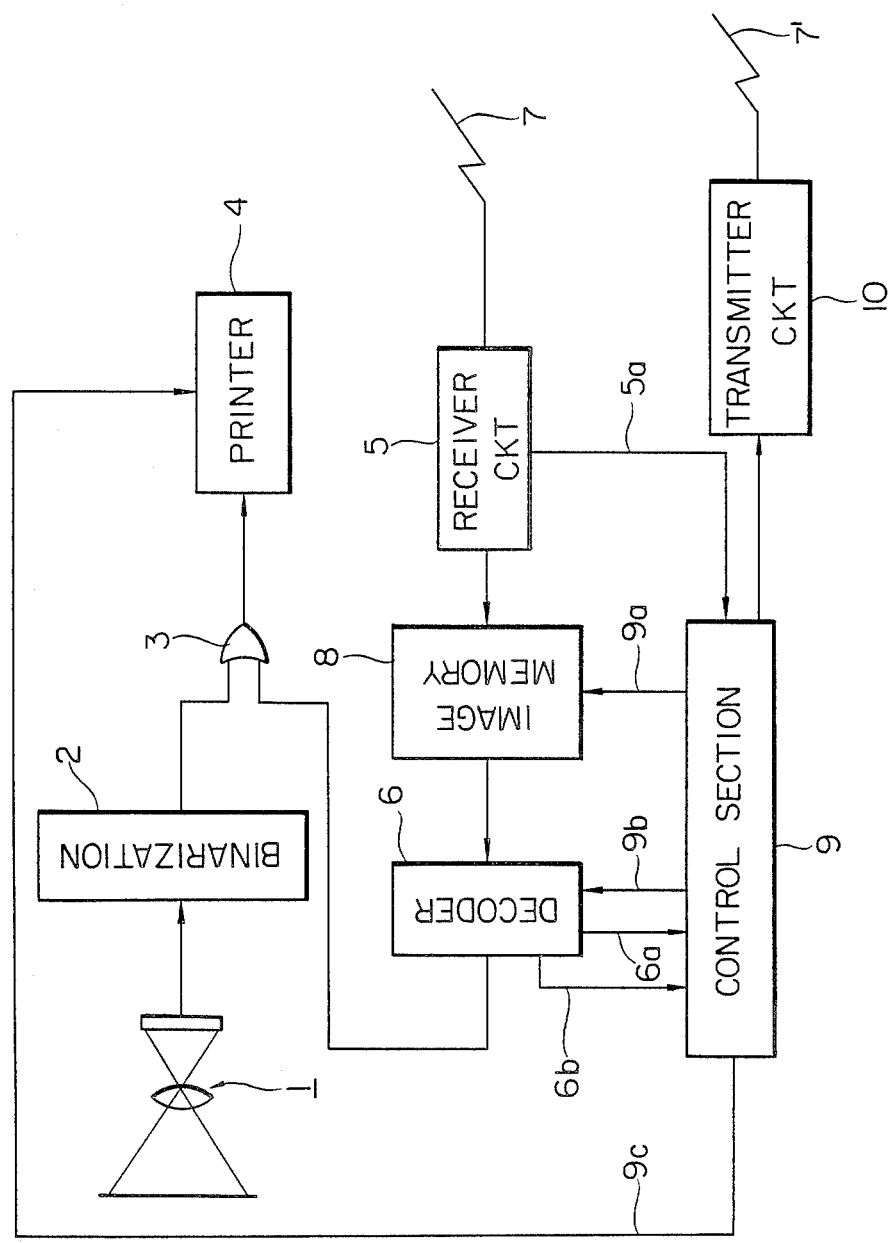
FIG. 2 is a block diagram showing an arrangement of a facsimile apparatus having the copy function and shows an embodiment of the present invention.

FIG. 2 shows an arrangement of a facsimile apparatus having an image memory. In FIG. 2, the same parts and components as those shown in FIG. 1 are designated by the same reference numerals. This description is made with respect to the case where the printer 4 is used during the copying operation. In the arrangement of FIG. 2, the image signal received from the line 7 is once stored in an image memory 8. In this case, to save the memory capacity, the compressed and coded data is not decoded but stored as is in the memory. The writing of data into the image memory 8 is controlled in a manner such that a control section 9 consisting a microprocessor or the like sends a write enable signal 9a to the image memory 8. The write enable signal 9a is outputted synchronously with a reception control signal 5a which is outputted from the receiver circuit 5 in response to various kinds of procedure signals.

The image data in the image memory 8 is read out under the control of the control section 9 after completion of the copying operation. The image data read out is inputted to the decoder 6 and returned to the binarized data from the compressed coded data. A decode enable signal 9b is sent to the decoder 6 from the control section 9, and an end pulse 6a is outputted from the decoder 6 to the control section 9 after the decoding. Upon completion of the decoding process, when the decoder 6 detects a decoding error, it outputs an error signal 6b to the control section 9. The control section 9 determines the quality of the image data received on the basis of this error signal.

The decoded and binarized image signal is transmitted through the gate 3 to the printer 4 and the printer 4 records the image data received in response to the printer enable signal 9c of the control section 9.

Figure 3:
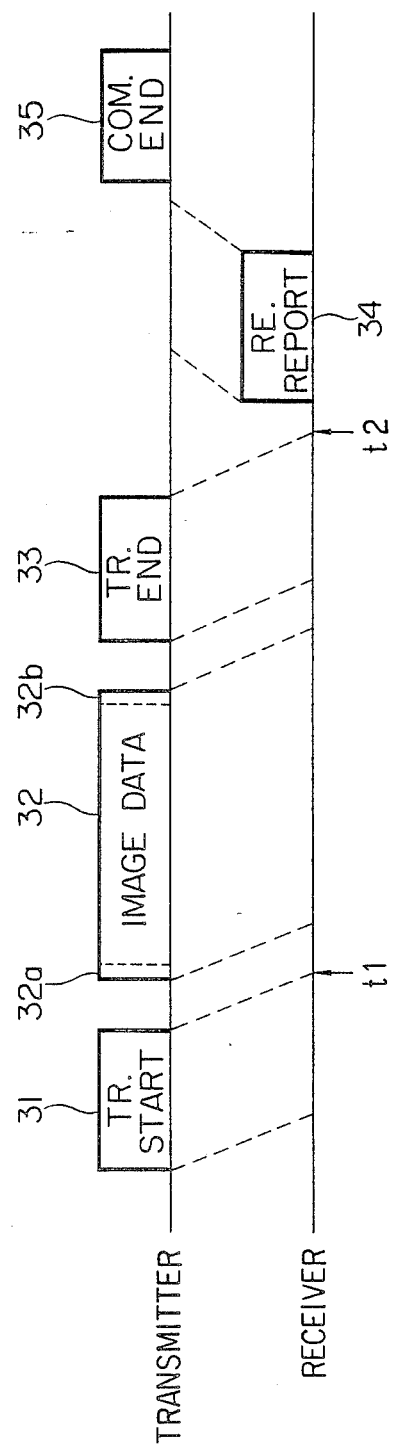
FIG. 3 is an explanatory diagram showing the operation in the apparatus of FIG. 2.

FIG. 3 shows the situation of communication of the apparatus as shown in FIG. 2. When the communication is started, the image transmitter side transmits a procedure signal indicated at reference numeral 31 and representing the start of transmission. In this case, the coordination of the communication speeds between the transmission and reception, the confirmation of functions between the transmission and reception, and the like are performed.

The apparatus on the receiver side starts the reception at a timing of $t_1$ and sequentially stores the received data into the memory. As shown in FIG. 3, a start of page (SOP) code 32a and an end of page (EOP) code 32b are added to the head and end of image data 32. The start of page code 32a is "0000 0000 0001" of the EOL code according to the Modified Huffman code. The end of page code 32b is the RTC signal which is a pair of this EOL codes. The end of transmission is shown on the receiver side by a transmission end signal 33.

When the start of page code 32a read out from the image memory 8 after completion of the copying operation is detected, the decoder 6 starts the operation. Then, the decoder 6 finishes the operation due to the detection of the end of page code 32b. Although the decoded data is sequentially recorded by the printer 4 in this case, the processing speed of the printer 4 is generally slower than the communication speed and storage speed into the memory; therefore, the image memory 8 also functions as time control means between the communicating means and the recording means.

When the decoding error is detected, the decoder 6 outputs the error signal 6b to the control section 9 as mentioned above. In response to the error signal 6b, the control section 9 informs the reception by way of a reception report signal 34., This process is performed subsequent to a timing $t_2$ when a procedure signal indicated at numeral 33 and representing the end of transmission was received.

Upon reception report, if no decoding error is detected, a normal (ACK) signal is sent to a line 7'. On one hand, if the decoding error is detected, an abnormal (NACK) signal is sent to the line 7' through a transmitter circuit 10. (Although the lines 7 and 7' have been individually shown, the same line can be also used for transmission and reception.)

On the transmitter side, the communication is finished when the ACK signal is received.

Figure 4:
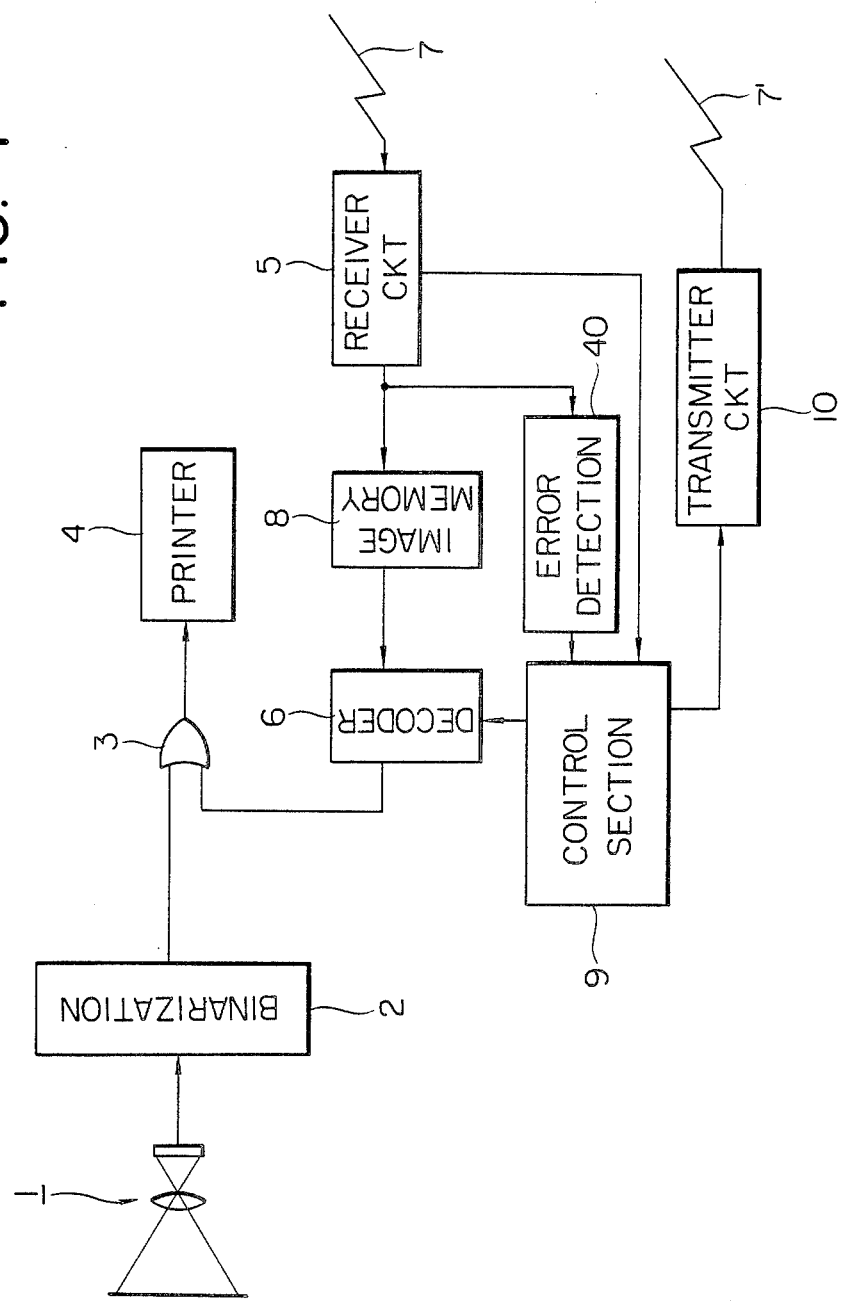
FIGS. 4 and 5 are block diagrams showing arrangements of further different facsimile apparatuses.

In the foregoing embodiment, the data in the image memory 8 is decoded and recorded after the printer is in the standby mode upon completion of the copying operation; consequently, the apparatus on the image transmitter side has to wait until the copying operation is finished with the line connected. This results in elongation of the line acquisition time and increase in communication costs. FIG. 4 shows the system taking account of this drawback, in which the same and corresponding parts and components as those of the apparatus shown in FIG. 2 are designated by the same reference numerals and their detailed descriptions are omitted. During the copying operation, the image data received through the line 7 is sent from the receiver circuit 5 to the image memory 8 and is sent to a decoding error detection circuit 40 as well. Even during the copying operation, the error detection circuit 40 decodes the received data and detects to see if there is an error or not. If an error is detected, the NACK signal is sent from the transmitter circuit 10 through the line 7' to the transmitter side, thereby instructing retransmission of the data. If no error is detected, the ACK signal is sent and the communication is finished. After completion of the copying operation, the image data is read out from the image memory 8 and decoded and then it is outputted to the printer.

However, in the foregoing embodiment, it is necessary that the error detection circuit 40 has a function similar to a decoder, so that there are drawbacks such that the arrangement of the whole apparatus becomes complicated and the manufacturing cost increases.

Figure 5:
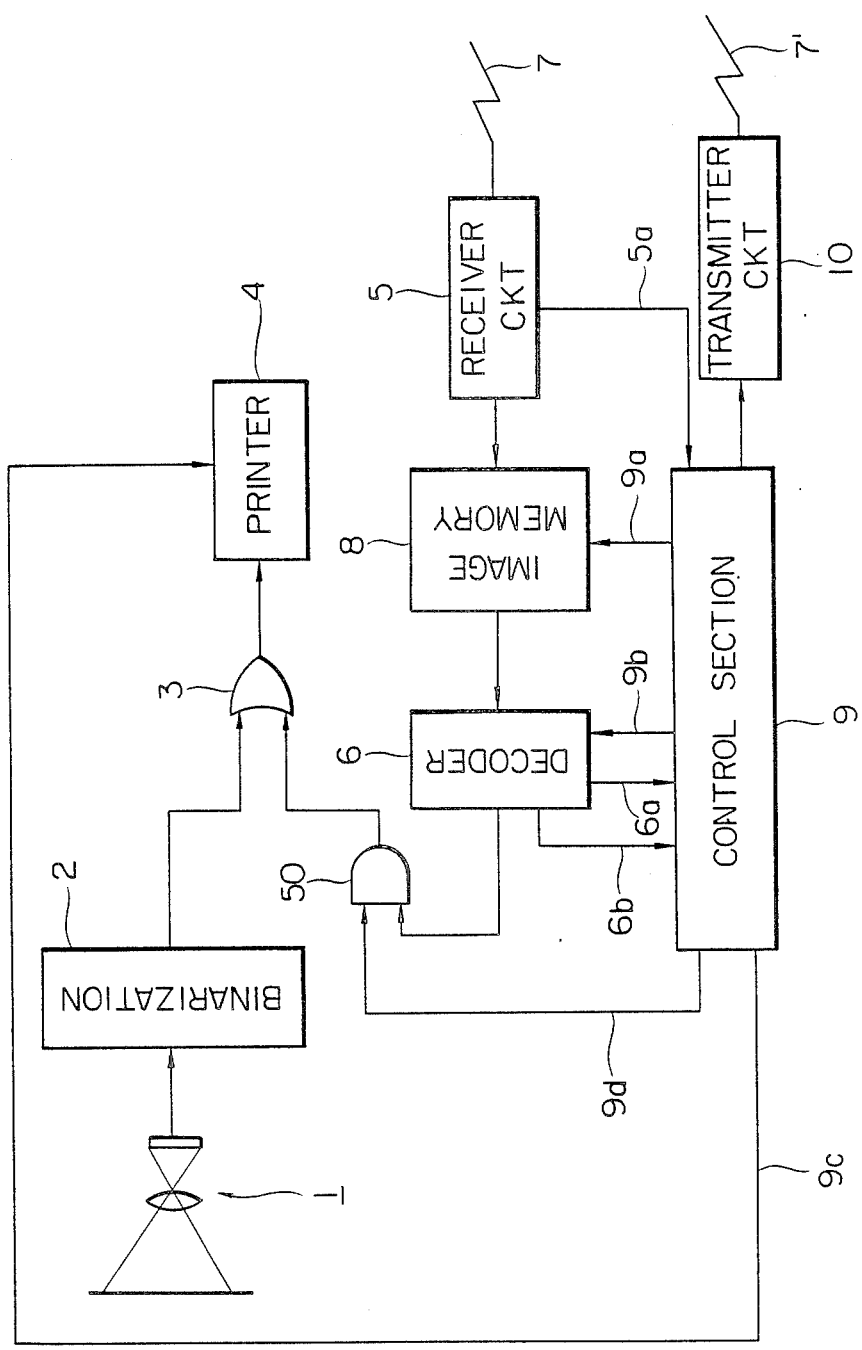

FIG. 5 shows an arrangement of a facsimile apparatus according to the embodiment, in which the same and similar parts and components as those shown in FIG. 2 are designated by the same reference numerals and their detailed descriptions are omitted.

In this invention, an AND gate 50 to control the output signal of the decoder 6 is provided. The opening and closure of the AND gate 50 are controlled by a switching signal 9d which is outputted from the control section 9.

Figure 6A:
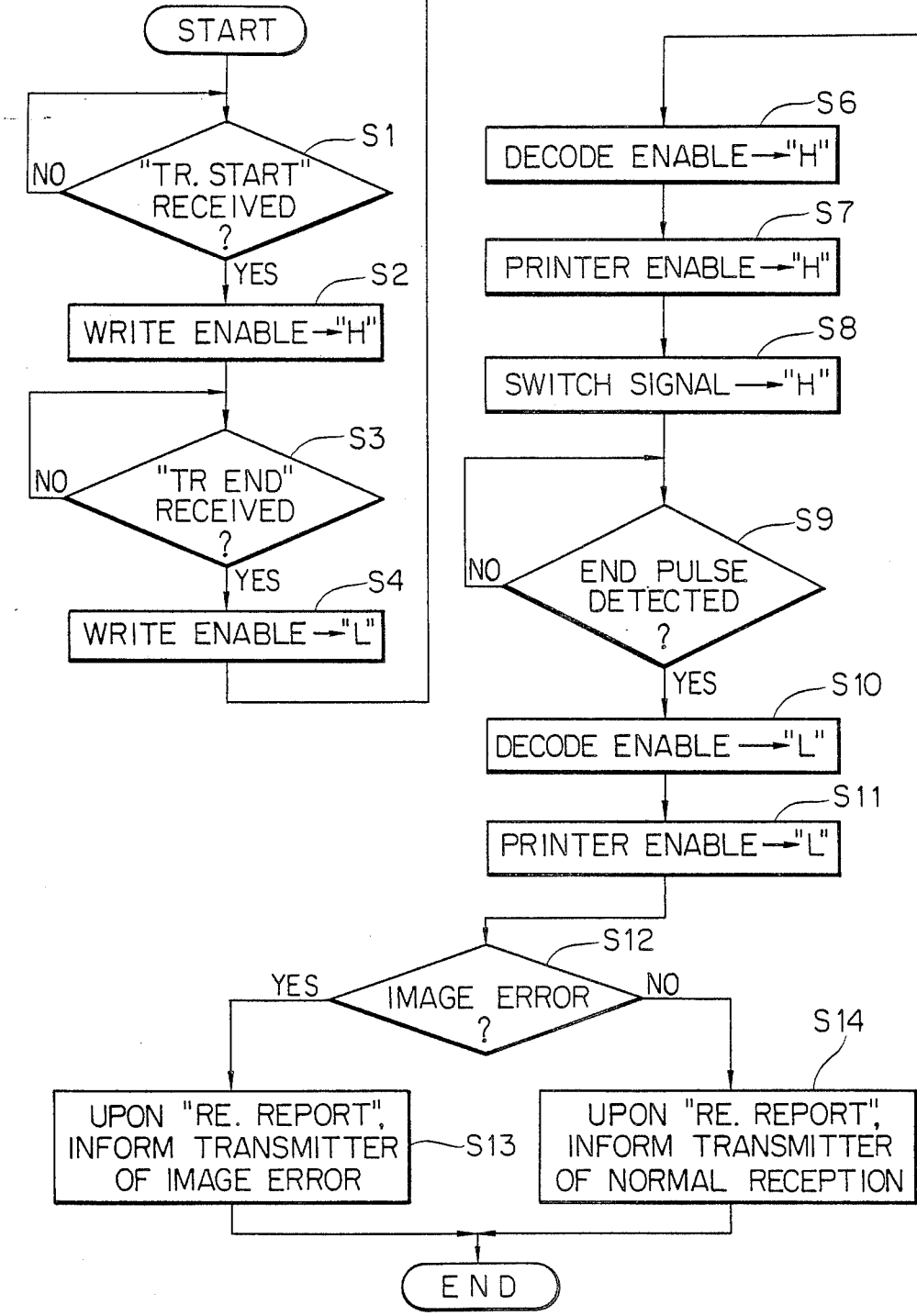
FIGS. 6, 6A, 6B and 6C are a flowchart showing the processing procedure of the control section in FIG. 5.
Figure 6B:
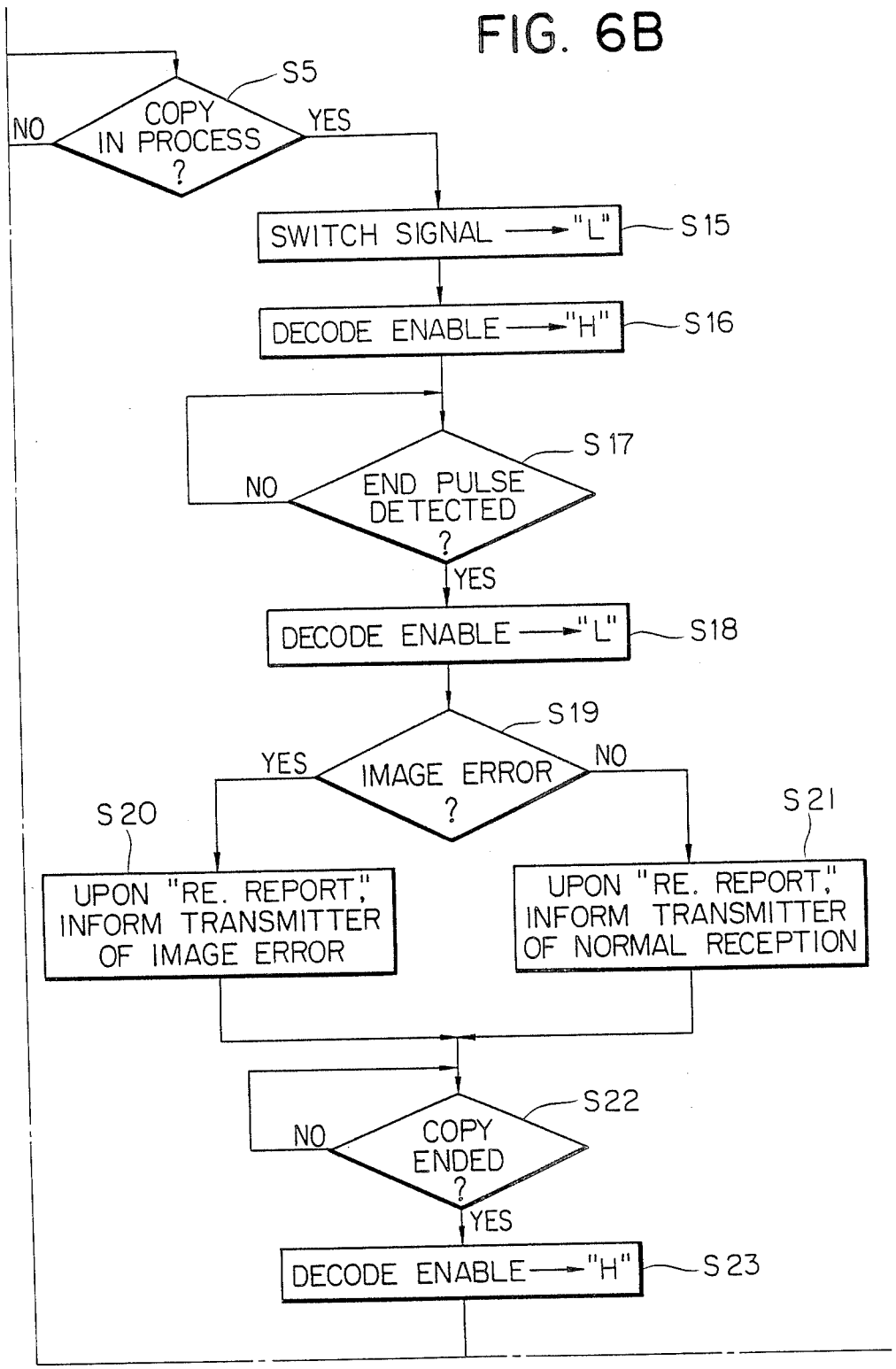
Figure 6C:
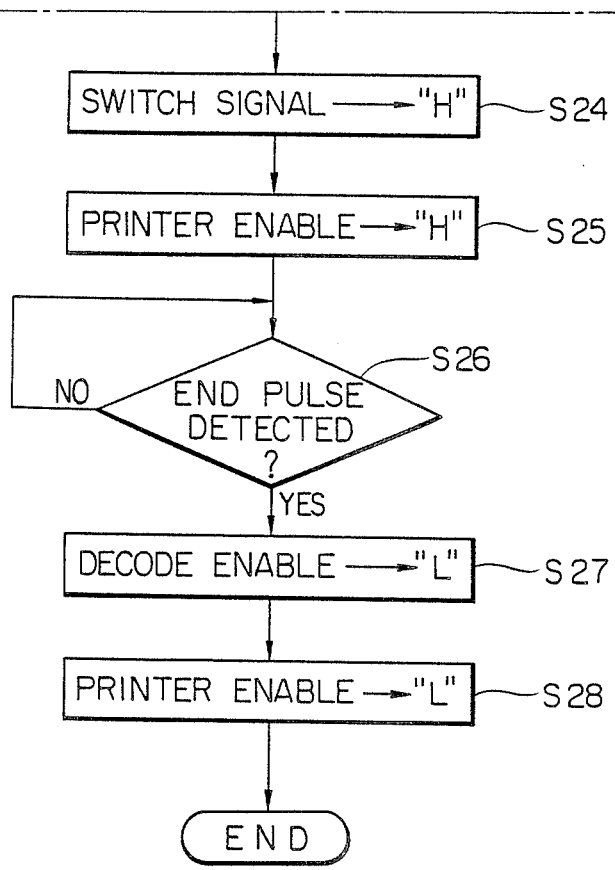
Figure 6:
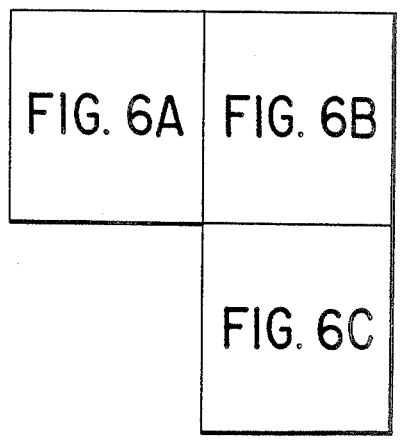

FIG. 6 shows a flowchart for the processing procedure of the control section 9 of FIG. 5.

Figure 7:
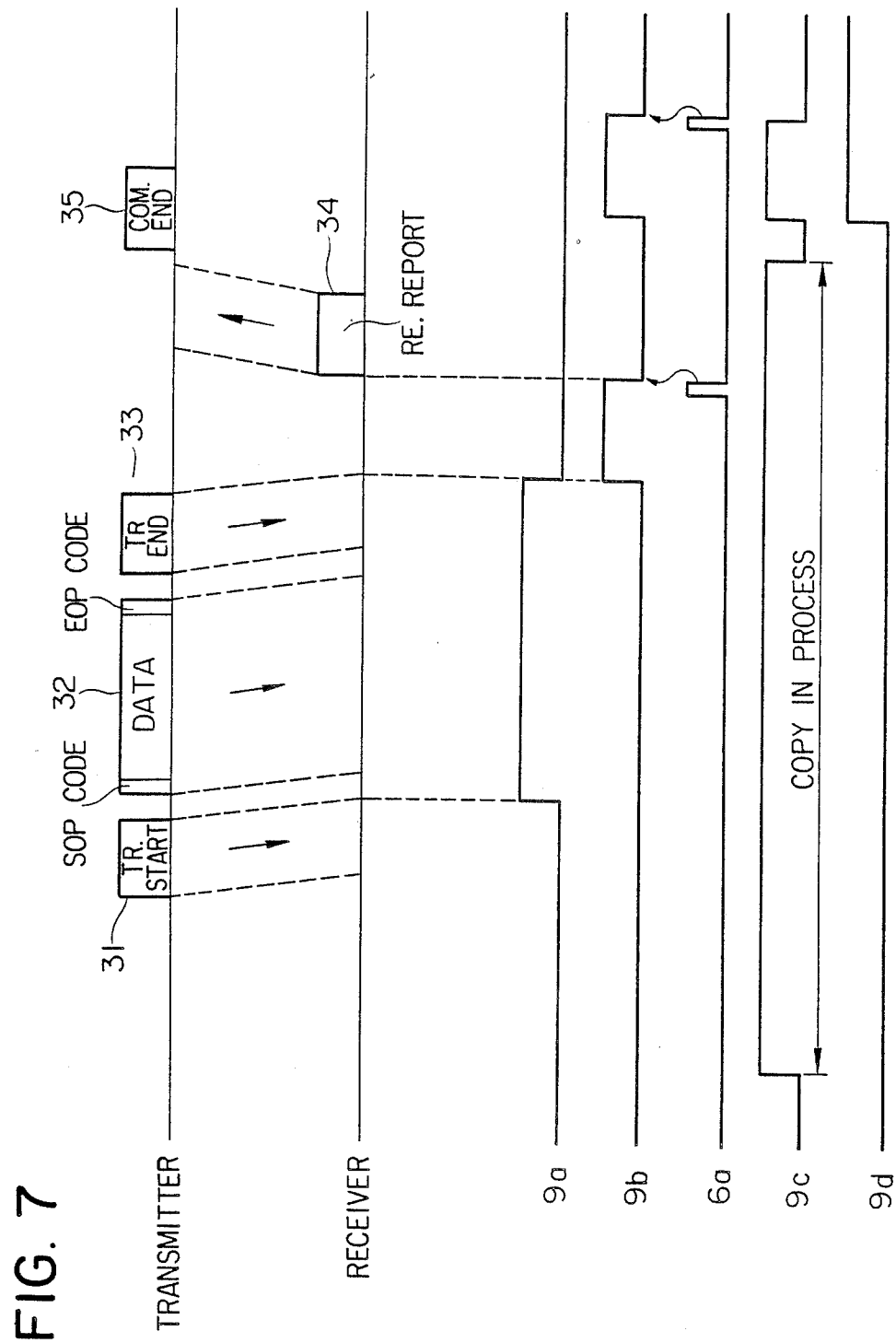
FIG. 7 is an explanatory diagram showing the overall in the apparatus of FIG. 5.

In step S1 of FIG. 6, the control section 9 waits until the transmission start signal is received during the interval 33 shown in FIG. 7. When the transmission start signal is received, the write enable signal 9a to the image memory 8 is set at a high level in step S2, thereby enabling the image data to be stored into the memory 8. Thus, the image data 32 from the transmitter side is sequentially stored in the image memory 8. In step S3, when the transmission end signal is received during the interval 33 of FIG. 7, the write enable signal 9a is set at a low level in step S4 and the storage of the image data into the memory 8 is stopped.

Subsequently, in step S5, a check is made to see if the printer 4 is executing the copying operation at present or not. If the copying operation is not performed, the processing routine advances to step S6. On the contrary, when it is being executed, step S15 follows.

In steps S6 to S8, the decode enable signal 9b and the printer enable signal 9c are set at a high level and at the same time the switching signal 9d is set at a high level, thereby allowing the output of the decoder 6 to be sent to the printer 4 through the AND gate 50. The decoded data is sequentially recorded by the printer 4. When the end pulse 6a of the decoder 6 is detected in step S9, the enable signals 9b and 9c are set at a low level in steps S10 and S11, thereby stopping the decoder 6 and printer 4.

Subsequently, in step S12, the error signal 6b of the decoder 6 is counted in a well-known manner to check the quality of the received image. If an error is detected, step S13 follows. If no error is detected, step S14 follows. Due to this, the normal or abnormal reception report is performed during the interval 34 in FIG. 7.

On the other hand, when the copying operation is being executed in step S5, the operation subsequent to step S15 is performed. The changes of the respective enable signals 9a to 9c and switching signal 9d in this case are shown in FIG. 7.

In case of FIG. 7, it is assumed that the apparatus has already been performing the copying operation before the image communication is started (9c). In the case where the copying operation is being executed, the switching signal 9d is set at a low level in step S15, thereby inhibiting that the output of the decoder 6 is inputted to the gate 3.

Next, the enable signal 9b is set at a high level in step S16 to make the decoder 6 operative. The decoder 6 sequentially reads out the image data in the image memory 8 and decodes the data in accordance with a predetermined system.

In step S17, the control section 9 waits until the end pulse 6a is outputted from the decoder 6. Upon completion of the decoding, the decoder 6 generates an end pulse as shown in FIG. 7, so that the enable signal 9b to the decoder 6 is returned to a low level in step S18.

In step S19, a check is then made to see if an image error is detected or not by checking the error detection signal 6b. For example, this discrimination of the image error can be performed by checking whether or not the number of lines, in each of which the number of pixels of the decoded line is improper, is over a predetermined number. If the image error is detected, step S20 follows. If no image error is detected, step S21 follows.

In step S20, the occurrence of the image error is informed by way of the reception report signal 34 in FIG. 7. On the contrary, if no error occurs, the normal reception is informed to the transmitter side by the signal 34 in step S21.

In the next step S22, the end of the copying operation is decided by checking the operation of the printer 4 or reading section 1. After completion of the copying operation, step S23 follows.

In step S23, the enable signal 9b to the decoder 6 is set at a high level and the switching signal is then set at a high level in step S24 to open the AND gate 50, thereby allowing the output of the decoder 6 to be inputted to the printer 4 through the gate 3. Further, the printer enable signal 9c to the printer 4 is set at a high level in step S25, thereby permitting the output of the decoder 6 to be recorded by the printer 4.

In the next step S26, a check is made to see if the end pulse 6a is outputted from the decoder 6 or not and the apparatus waits for the end of recording of the received image data.

In the case where the recording of the received image data is finished, the enable signal 9b to the decoder 6 is set at a low level in step S27 and the enable signal 9c to the printer 4 is then set at a low level in step S28, and the operation is finished.

In this way, the transmitted image data is stored into the image memory 8 even while the copying operation is being executed. Further, the received data is decoded and an error is detected in the state in that the output of the decoder 6 is shut out. In this decoding operation, the printer 4 is disconnected from the decoder 6, so that the decoding and checking operations of the received image data are soon finished. Therefore, the quality of the received image data can be reported to the image transmitter side in response to the result of this decoding, thereby preventing that the communication time is mainly elongated. In this manner, the image data can be received even during the copying operation and immediately after completion of the copying operation, the received image data can be recorded.

Although the embodiment regarding the facsimile apparatus has been shown as an example in the above, the technology of the present invention is not limited to facsimile apparatuses but can be also applied to a various kinds of other image processing apparatuses having the communication function which are used as recording output device of a computer system, or the like.

The operation when no recording paper is set on the receiver side will now be explained. Referring to FIG. 9, a block diagram of a facsimile receiving apparatus provided with an image memory is shown. In the diagram, the receiver circuit 11 is a well-known line interface to distribute the signal received from the line 14 into an image signal 11a and a facsimile control procedure signal 11b. A transmitter circuit 18 is also a well-known line interface to transmit a facsimile control signal 16a from a control section 16 to a transmission line 14'. In case of a telephone line or the like, the same line is used as the line 14 and 14'.

In FIG. 9, the control section 16 consists of a microcomputer, a memory for control, and the like. The image signal 11a is written into an image memory 15 consisting of a random access memory or the like under control of the control section 16. The writing operation is controlled by an enable signal 16b which is outputted from the control section 16.

The decoder 12 is connected to an output of the image memory 15. The decoder 12 is a circuit to convert the image signal compressed by way of a coding system such as Modified Huffman or the like into a pixel signal expressed by two values of black and white. The operation of the decoder 12 is controlled by the control section 16 through an enable signal 16c.

The output of the decoder 12 is recorded and outputted by the printer 13 consisting of a thermal recording apparatus, an ink jet recording apparatus, or the like. The operation of the printer 13 is controlled by an enable signal 16d which is outputted from the control section 16. In general, the recording apparatus is provided with recording paper detecting means 13' consisting of a photo interrupter or the like to detect whether recording papers are set or not or whether they exist or not. A recording paper detection signal 13a is inputted to the control section 16

Further, the control section 16 controls each power source of the apparatus through a power source control section 17 in accordance with the procedure for the operation.

In the foregoing arrangement, the image signal received through the receiver circuit 11 has already been subjected to the coding process on the transmitter side and this coded image signal is once stored into the image memory 15. After the image signal as much as one page was received and completely stored in the image memory 15, the control section 16 makes the decoder 12 operative.

The decoder 12 reads and decodes the image data stored in the image memory 15 and sequentially sends the decoded output to the printer 13. The printer 13 sequentially records and outputs the received data on the basis of a predetermined system.

In the foregoing operation, a space occurs in the image memory 15 in association with the recording operation, so that the subsequent image data can be received and temporarily stored using this space area. On one hand, if the memory capacity is large enough, all of the received data may be stored.

Figure 10:
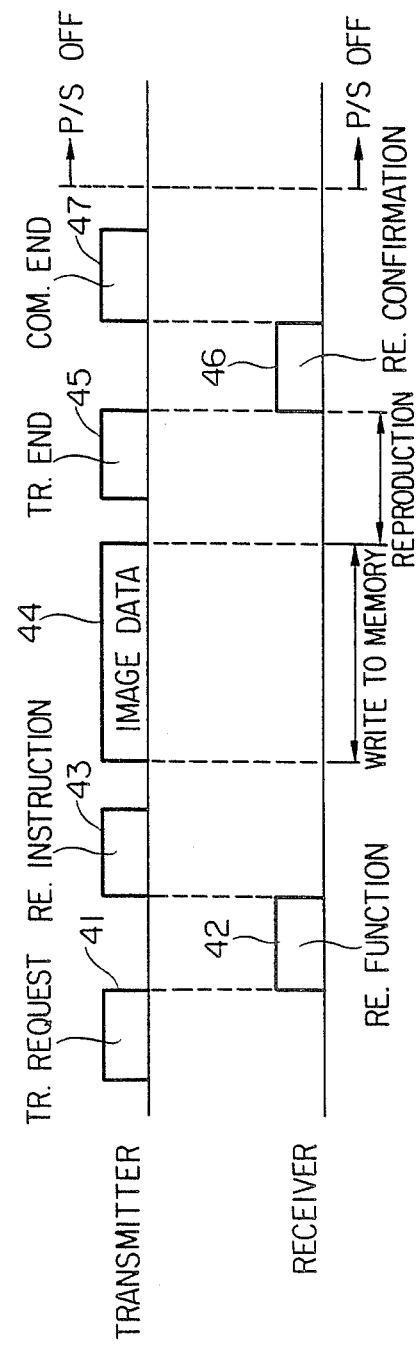
FIG. 10 is an explanatory diagram showing the communication procedure in the arrangement of FIG. 9.

FIG. 10 shows an outline of the standard operation in the apparatus of FIG. 9. The procedure which is performed by the transmitter side is shown in the upper portion of FIG. 10, while the procedure which is carried out by the receiver side apparatuses is shown in the lower portion of FIG. 10.

When the communication line is connected, the facsimile apparatus on the transmitter side transmits a transmission request signal indicated at numeral 41 in FIG. 10. In this case, the information such as the possible transmission rate, possible coding system, original size, etc. of the apparatus on the transmitter side is sent to the receiver side. Subsequently, in response to this information, the receiver side likewise transmits the reception function procedure signal including the information such as the possible transmission rate, decoding system, presence/absence of the recording papers detected by the detector of the printer 13, etc. as indicated at numeral 42 in FIG. 10.

In response to this information, the transmitter side apparatus determines various kinds of parameters such as the transmission rate, coding system, original size, etc. which are possible between the transmission and reception. Then, the apparatus transmits a reception instruction 43 and then image data 44. This image data is sequentially stored in the image memory 15. Whenever one page is received, the receiver side apparatus sequentially decodes and records the image data in the image memory 15 and at the same time the apparatus detects the number of lines having image errors and checks the quality of the received image data.

On the other hand, when all of the image data to be transmitted are completely transmitted, the transmitter side apparatus transmits a transmission end signal 45. In response to this signal 45, the receiver side apparatus transmits a reception confirmation signal 46 in accordance with the number of foregoing decoding errors. If an error occurs, a predetermined signal is sent to the transmitter side at this stage and the transmission rate is again dropped and the transmission and reception of the image data are performed.

When the reception confirmation signal 46 is received from the image receiver side, the transmitter side apparatus sends a communication end signal 47 and the power sources of both apparatuses are cut off and the communication operation is finished.

However, if the recording paper is not set in the printer 3 at the start of the communication, the receiver side apparatus transmits a receiving function signal to which the information representing that no recording paper exists was added. Therefore, there is a drawback such that the transmitter side apparatus cannot perform the communication operation at all in the case where no recording paper is set on the receiver side.

Figure 11:
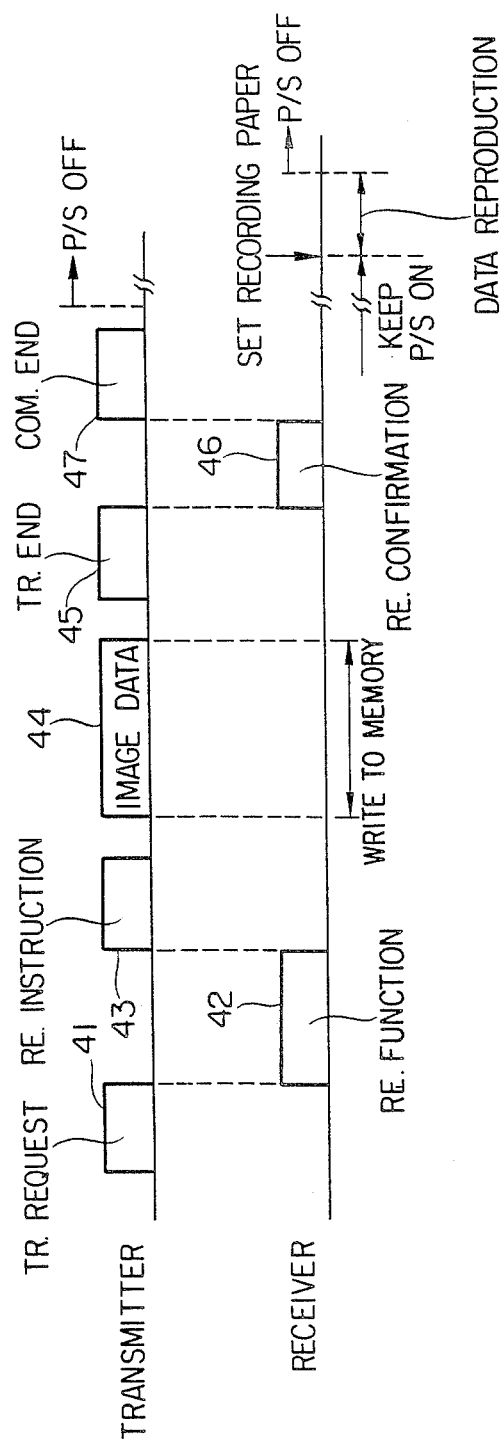
FIG. 11 is an explanatory diagram showing the procedure according to the present invention.

FIG. 11 shows the situation of the communicating operation in which the above-mentioned drawback is eliminated. FIG. 11 is equivalent to FIG. 10. In FIG. 11, the same signals as those in FIG. 10 are designated by the same reference numerals and their detailed descriptions are omitted. In this invention, even in the case where the absence of the recording paper has been detected by the recording paper detection circuit of the printer 13, the information indicative of the absence of the recording paper is not added to the receiving function signal 42 but the information representing that the recording paper is set and the facsimile communication is possible is added to the signal 42 and then this signal is transmitted. Due to this, the transmitter side apparatus transmits the reception instruction 43 and image data 44 under the same condition as that in the case where the recroding paper is set on the receiver side. In the receiver side apparatus (apparatus of the present invention), the control section 16 makes the image memory 15 operative by the enable signal 16b, thereby allowing the image data 11a which is inputted from the receiver circuit 11 to be sequentially stored in the memory 15. Then, the same procedure as that shown in FIG. 10 is performed hereinafter until the end of the communicating operation.

Upon completion of the procedure, the power source is cut out in the transmitter side apparatus. However, in the receiver side apparatus, the power source of the apparatus is held to be ON by the control section 16 through the power source control section 17, and the operator is warned of the absence of the recording paper, thereby instructing the operator to set the recording papers. In this way, the data stored in the image memory 15 is sequentially decoded and recorded. Upon completion of the recording the main power source is shut off by the power source control section 17 to stop the operation of the apparatus.

Figure 12A:
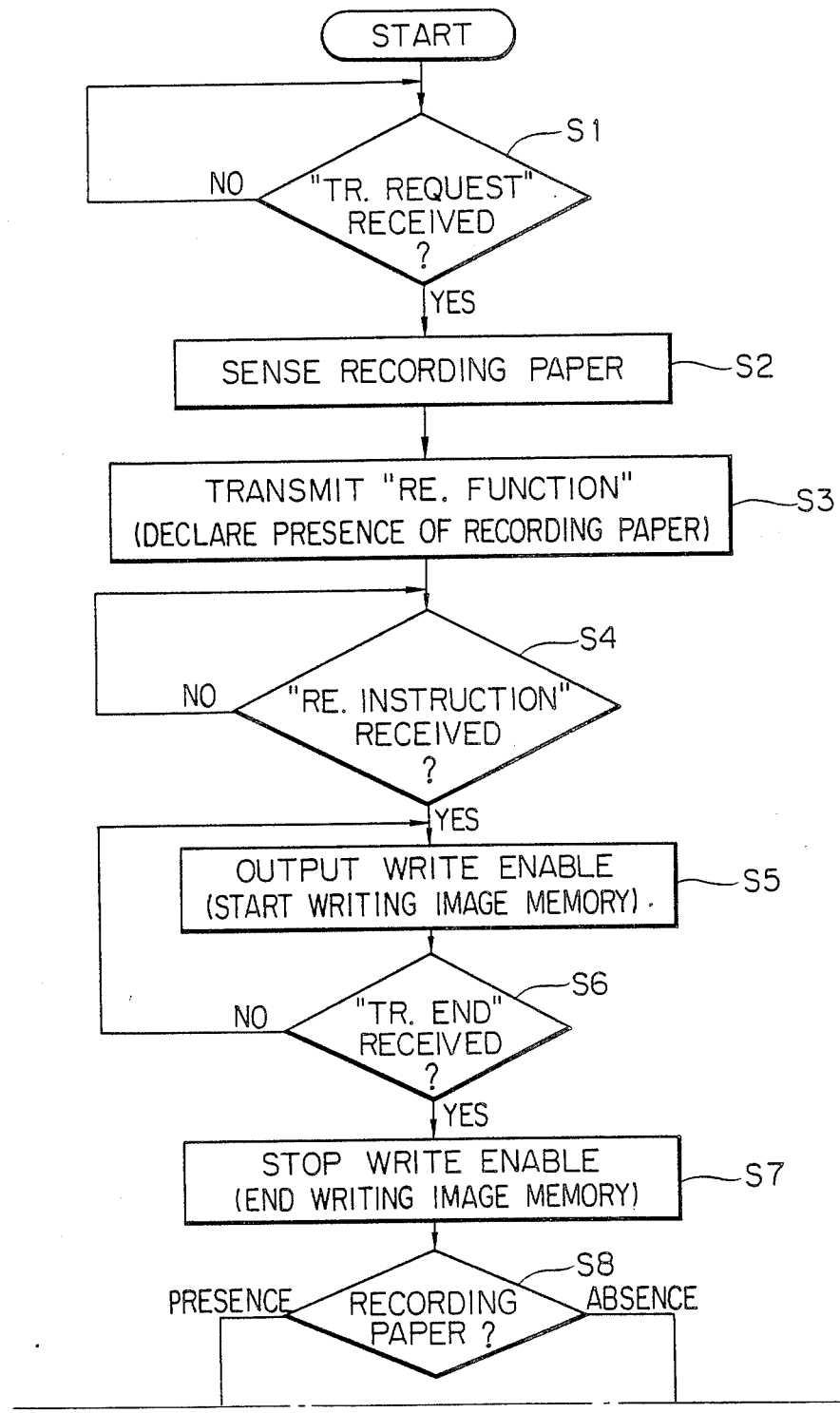

FIG. 12 shows a flowchart of the control procedure of the control section 16.

When the communicating operation is started due to the connection of the line, the control section 16 checks to see if the transmission request signal 41 is received or not in step S1 of FIG. 12.

If the transmission request signal is received, in step S2, the absence or presence of the recording paper is detected by the detector 13' of the printer 13.

In the next step S3, even when no recording paper exists as well, the receiving function signal 42 to which the information indicative of the presence of the recording paper was added is transmitted.

Then, the apparatus waits until the reception instruction signal 43 from the transmitter side is received or not in step S4.

When the reception instruction signal is received, in step S5, the enable signal 16b is set at a high level, thereby allowing the image data 11a to be sequentially stored into the image memory 15. This writing operation into the memory is continued until it is confirmed that the transmission end signal 45 was transmitted from the transmitter side in step S6.

In the case where the transmission end signal was transmitted, in step S7, the enable signal 16b is set at a low level to stop the writing operation into the image memory 15.

In the next step S8, the presence or absence of the recording papers in the printer 13 is again checked. If the recording papers are set, step S9 follows and if no recording paper is set, step S14 follows.

If the recording papers are set, in step S9, the enable signal 16c is set at a high level to make the decoder 12 operative and the data in the image memory 15 is sequentially read out and decoded. In the next step S10, the enable signal 16d is set at a high level to make the printer 13 operative, thereby allowing the output signal of the decoder 12 to be sequentially recorded.

Subsequently, the apparatus waits until all of the data in the image memory 15 are recorded in step S11.

After completion of the recording and output of the data in the image memory, the reception confirmation signal is transmitted in step S12 and then the apparatus waits for the reception of the communication end signal 47 in step S13. If this signal 47 is received, the power source is shut off to stop the process.

On the contrary, if the recording paper is set, the reception confirmation signal is transmitted in step S14.

In the next step S15, a check is made to see if the communication end signal 47 from the transmitter side is transmitted or not.

Subsequently, a check is made to see if the recording papers are set or not in step S16 by checking an output of the recording paper detector of the printer 13. When the recording papers are set by the operator and the apparatus enters the recording standby mode, step S17 follows and the enable signal 16c is outputted to start the operation of the decoder 12. Further, in step S18, the enable signal 16d is outputted to start the recording of the output signal of the decoder 12 by the printer 13.

In the case where it is confirmed that all of the data in the image memory 15 were recorded in step S19, the main power source is shut off by the power source control section 17 to stop the communicating operation.

In this manner, the receiving operation of the facsimile can be performed by effectively using the image memory even if no recording paper is set.

Figure 13:
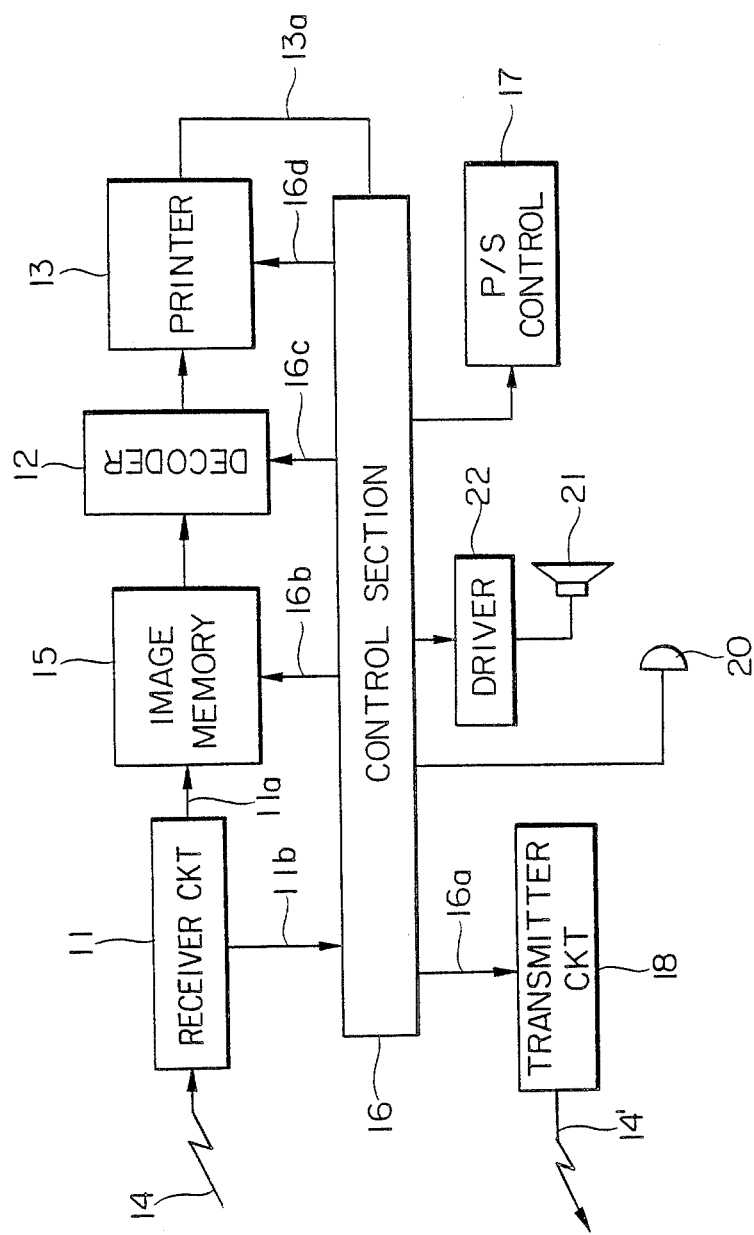
FIG. 13 is a block diagram showing another different embodiment of a facsimile apparatus to which the present invention is applied.

In addition to the above-described embodiment, as shown in FIG. 13, it is also possible to adopt an arrangement such that visible output means 20 consisting of a light emitting diode or the like, audio output means 21 consisting of a speaker or the like and driven through a driver 22, and the like are provided, and when the absence of the recording paper is detected, the control section 16 drives those output means at proper timings after the end of communication and thereby informing the operator to set the recording papers. The arrangement of the other portions of FIG. 13 is substantially the same as FIG. 9; therefore, the detailed description is omitted here.

According to such an arrangement, the absence of the recording paper is informed by the warning means by way of the light, sound or the like. Thus, it is prevented that the image data is vainly continuously stored into the image memory and the received data can be certainly recorded and outputted.

Although the embodiment regarding the facsimile apparatus has been shown as an example in the above, the foregoing arrangement is not limited to facsimile apparatuses but may be obviously applied to image processing apparatuses of any other systems.

In addition, even in the facsimile receiving apparatus as mentioned above, if the jam of the recording paper occurs, there is not provided means for automatically recording and reproducing the page at which the jam occurs on the receiver side and, accordingly, the communication is interrupted simultaneously with the occurrence of the jam.

On one hand, even if the image can be continuously received by providing a memory of a large memory capacity, there is a drawback such that it is impossible to know the number of residual pages of the images received after the paper jam was recovered.

Figure 14:
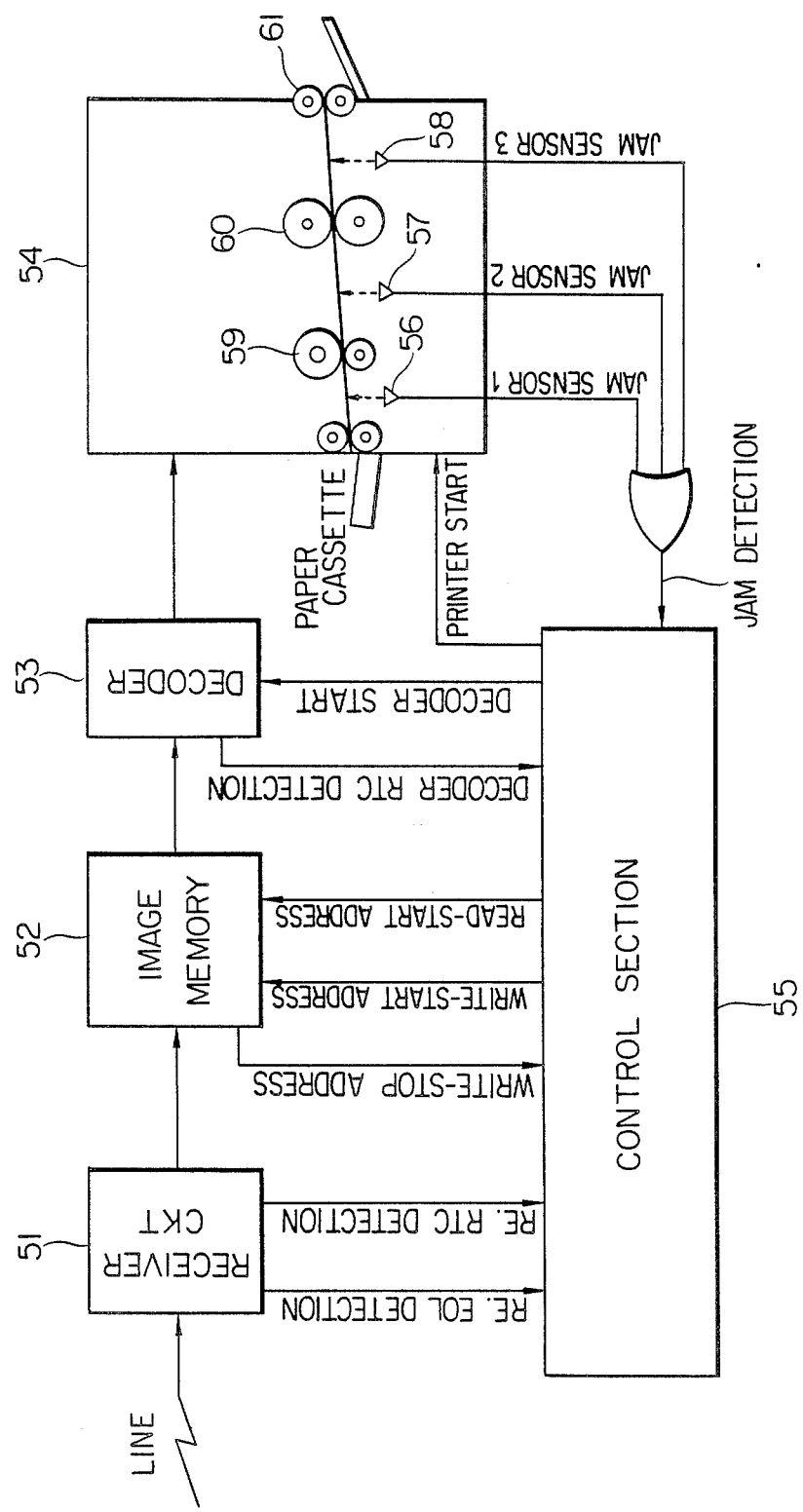

FIG. 14 shows a block diagram of an apparatus according to the present invention.

In FIG. 14, a receiver circuit 51 is a well-known interface circuit which serves to receive the MH (Modified Huffman) coded image signal received from the line and write it into an image memory 52.

The writing into the memory 52 is started by detecting an EOL (end of line) signal and is stopped by detecting a RTC (return to control) signal. The memory 52 has a capacity of, e.g., 32 Mbits.

Since only the image of the A4 size is handled by the apparatus of the invention, the pixel density is 8 pel/mm × 8 pel/mm and therefore the pixel information of one page of the A4 size is about 4 Mbits. However, the pixel information is accumulated as the MH coded compressed format into the memory 52, so that the page information as much as about ten to one hundred pages can be accumulated.

A signal read out from the memory 52 is led to a decoder 53 and decoded.

The decoder 53 is a well-known MH decoding circuit and converts the MH coded image data into a pixel signal and outputs it to a printer 54.

The decoding operation is started when a decode start signal from a control section 55 becomes a high level and the readout of the data from the memory is started.

Actually, the decoding is started from the timing when the EOL signal is detected and in the case where the RTC signal is detected, the RTC detection is informed to the control section simultaneously with the stop of decoding.

The printer 54 is of the electrostatic recording type and jam sensors 56 to 58 are provided therein at three locations. Outputs of the jam sensors 56 to 58 are supplied to the control section 55.

The jam sensor 56 detects the jam of the recording paper before a developing drum 59. The jam sensor 57 detects the jam between the developing drum 59 and a fixing roller 60. The jam sensor 58 detects the jam at a portion of a delivery roller 61. Therefore, even if the jam occurs at any location in the printer 54, it can be detected by the control section 55.

The control section 55 is constituted by a well-known control circuit consisting of a microcomputer, a ROM, a RAM, etc.

The control section 55 sets a write start address and a readout start address to the memory 52, respectively, and designates the head addresses in case of writing image data into the memory 52 from the receiver circuit 51 and reading out the image data from the memory 52 to the decoder 53.

Further, the control section 55 senses the write end address of the memory 52 in the state whereby the writing into the memory 52 is stopped.

A decode start signal is set at a high level to allow the decoder 53 to start the decoding. Thereafter, when the RTC detection signal from the decoder 53 is generated, the decode start signal is reset at a low level.

A print start signal is sent to the printer 54 to instruct the start of recording.

Figure 15:
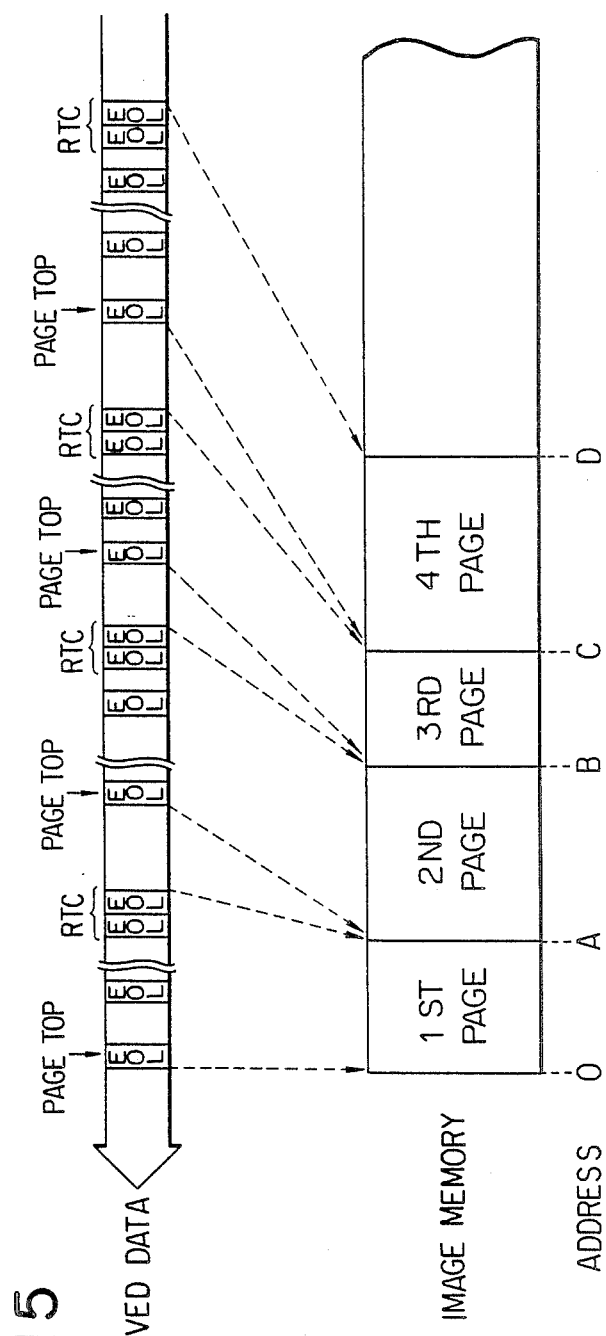

FIG. 15 shows the state of accumulation of the received data into the memory 52.

First, the control section 55 sets the head address for writing into the memory 52 to address 0.

When the receiver circuit 51 detects the EOL signal in the beginning of the first page of the received image, it starts the writing into the memory 52 from address 0. When the RTC signal is detected, it is informed to the control section 55 and at the same time the writing of the received data is stopped.

When the control section 55 receives the RTC detection signal from the receiver circuit 51, it knows that the accumulation of the image information of the first page has been completed and senses the write stop address A into the memory 52 at this time point.

Then, the write head address is set to address A for the writing of the next page.

Figure 16:
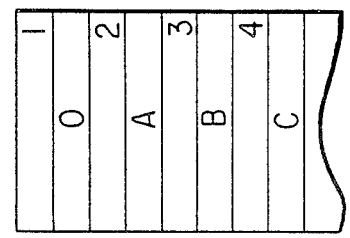

Simultaneously, as shown in FIG. 16, page number "1" and the write head address "0" of the first page are stored in the page accumulation control table in the RAM in the control section 55.

In a similar manner as above, as shown in FIGS. 17-(A) to 17-(D), the second to fourth pages are stored in the memory 52.

FIGS. 18-(A) to 18-(D) show the writing states into the page accumulation control table.

Thus, as shown in FIG. 16, the fact that the page 1, page 2, page 3, and page 4 are respectively accumualted in the addresses 0, A, B, and C in the memory is stored in the page accumulation control table.

As described above, the control section 55 accumulates the received image information into the memory 52. When at least the image data of one page is accumulated into the memory 52, the readout start address is set to the head address in the memory 52 where that page is accumulated and the decode start signal and the printer start signal are set at a high level, thereby performing the decoding and recording and reproduction of that page.

Figure 19:
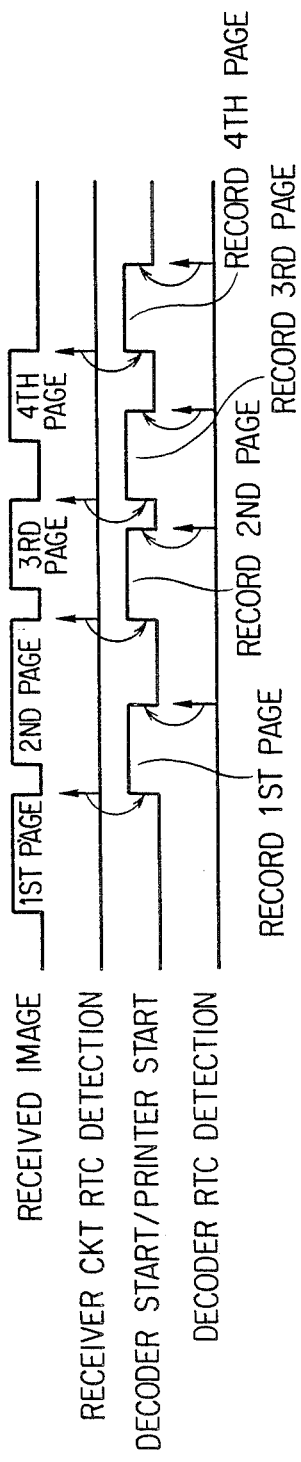

FIG. 19 shows a time chart in the case where the image signals of four pages are received and no jam of the recording paper occurs during the receiving operation and the recording output is normally performed.

Figure 20:
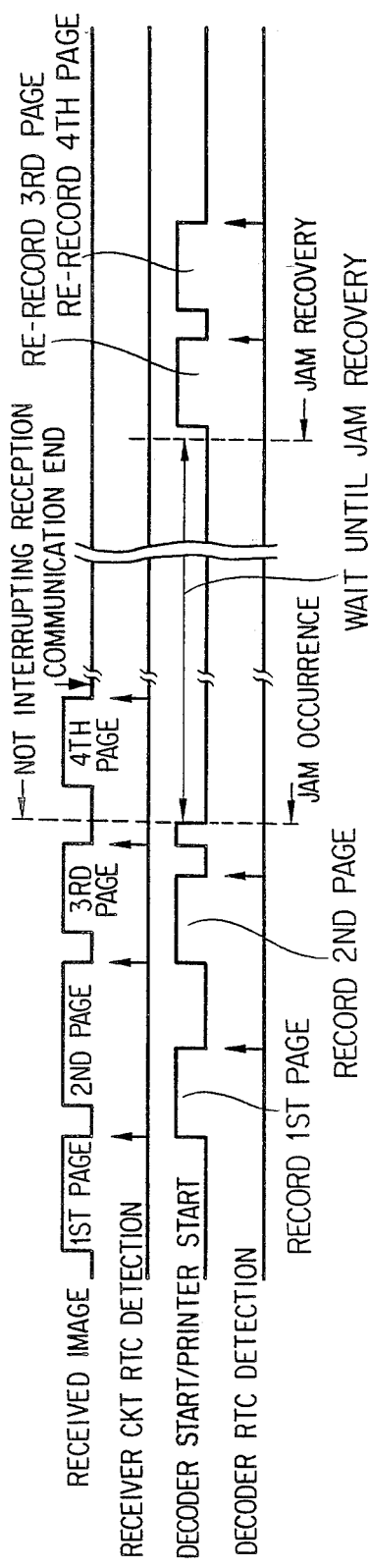

In addition, FIG. 20 shows a time chart in the case where after the recording output of the second page was finished, the jam is detected by the jam sensors upon recording of the third page.

Conventional facsimile receivers interrupt the reception when the jam occurs. However, according to the present invention, the received image data is continuously accumulated into the memory 52 without interrupting the reception.

In the example shown in FIG. 20, the image data until the fourth page is continuously received.

However, as shown in FIG. 20, the decoding and recording reproduction of the received pages are interrupted and the jam sensors are continuously monitored until the jam is recovered.

On the other hand, when the jam is recovered, in order to decode and record the information of the third and fourth pages whose recording was interrupted, the control section 55 designates the readout start address of the third page to address B on the basis of the accumulation control table shown in FIG. 16 and outputs the decode start signal and printer start signal. After the information of the third page was recorded and reproduced, the readout start address of the fourth page is likewise designated to address C and the information of the fourth page is recorded and reproduced, then the operation is finished.

Figure 21:
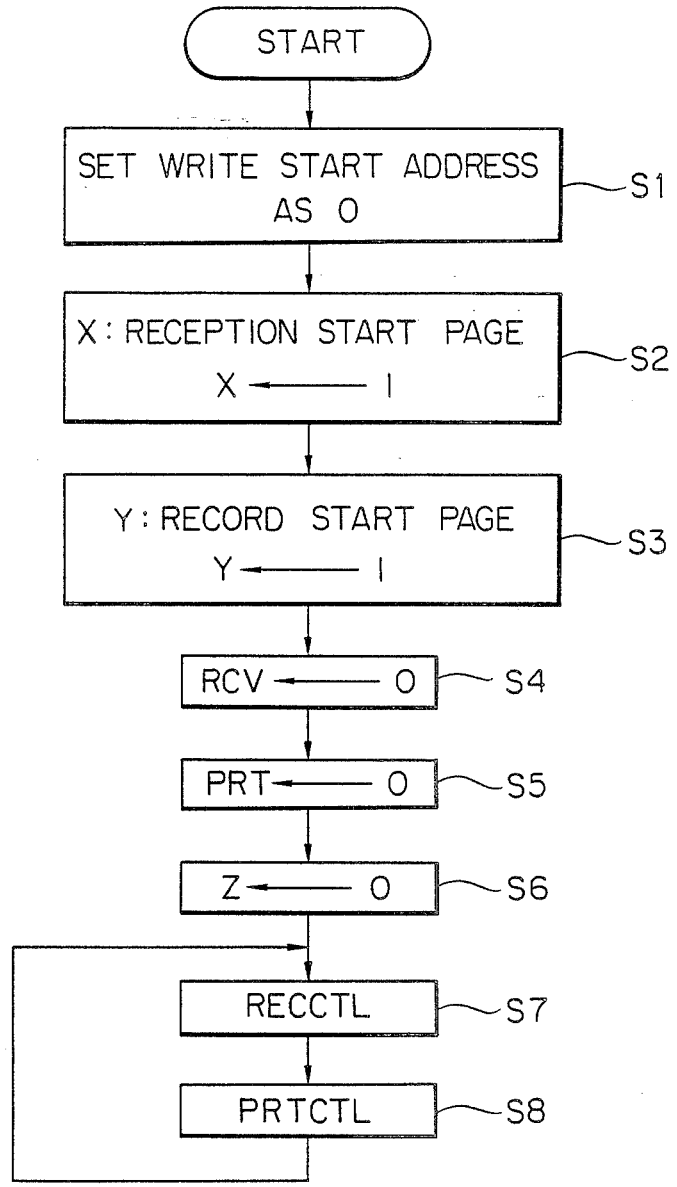
Figure 23A:
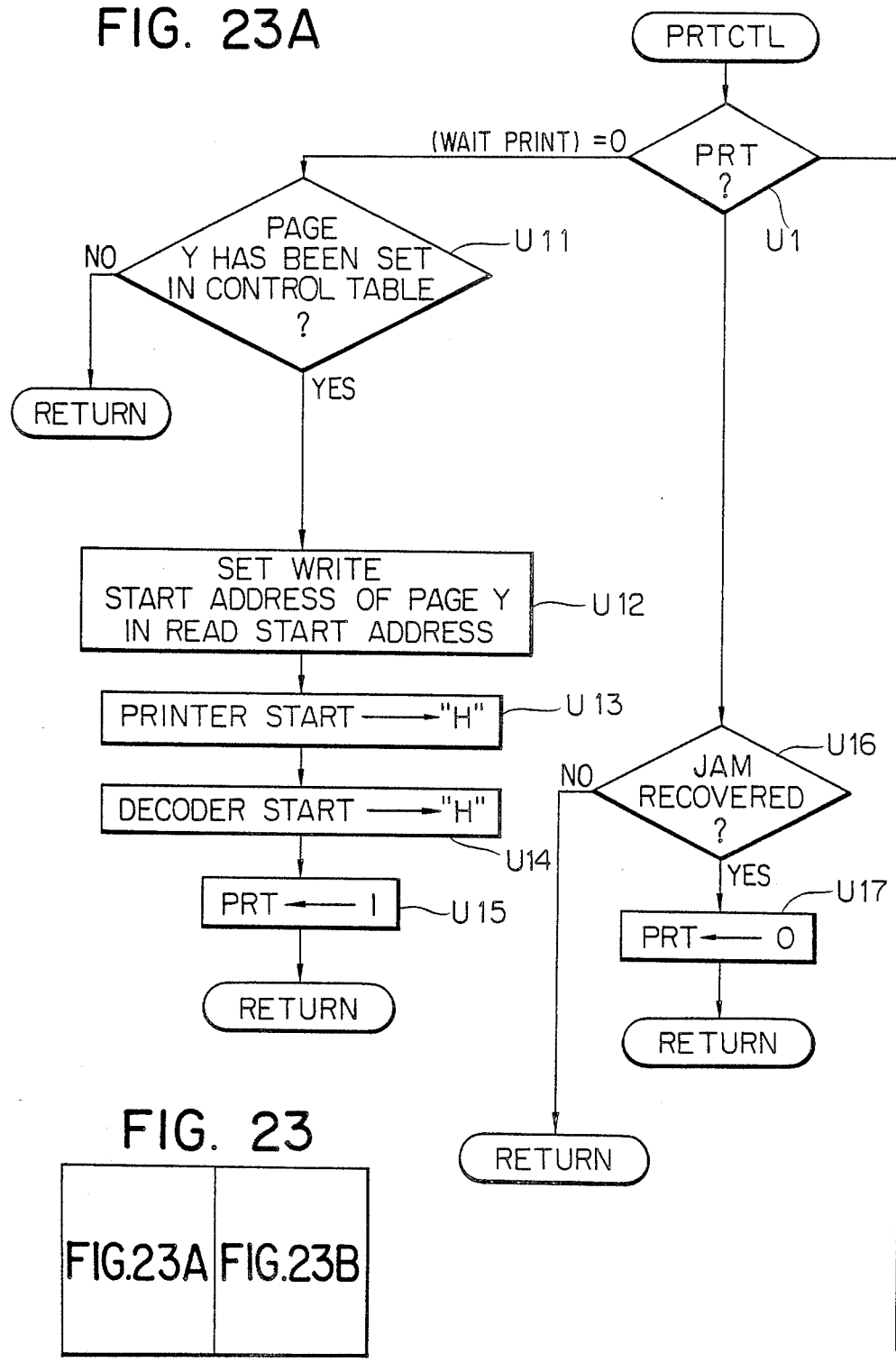
Figure 23:
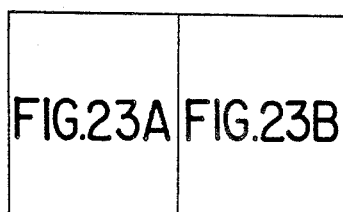
Figure 23B:
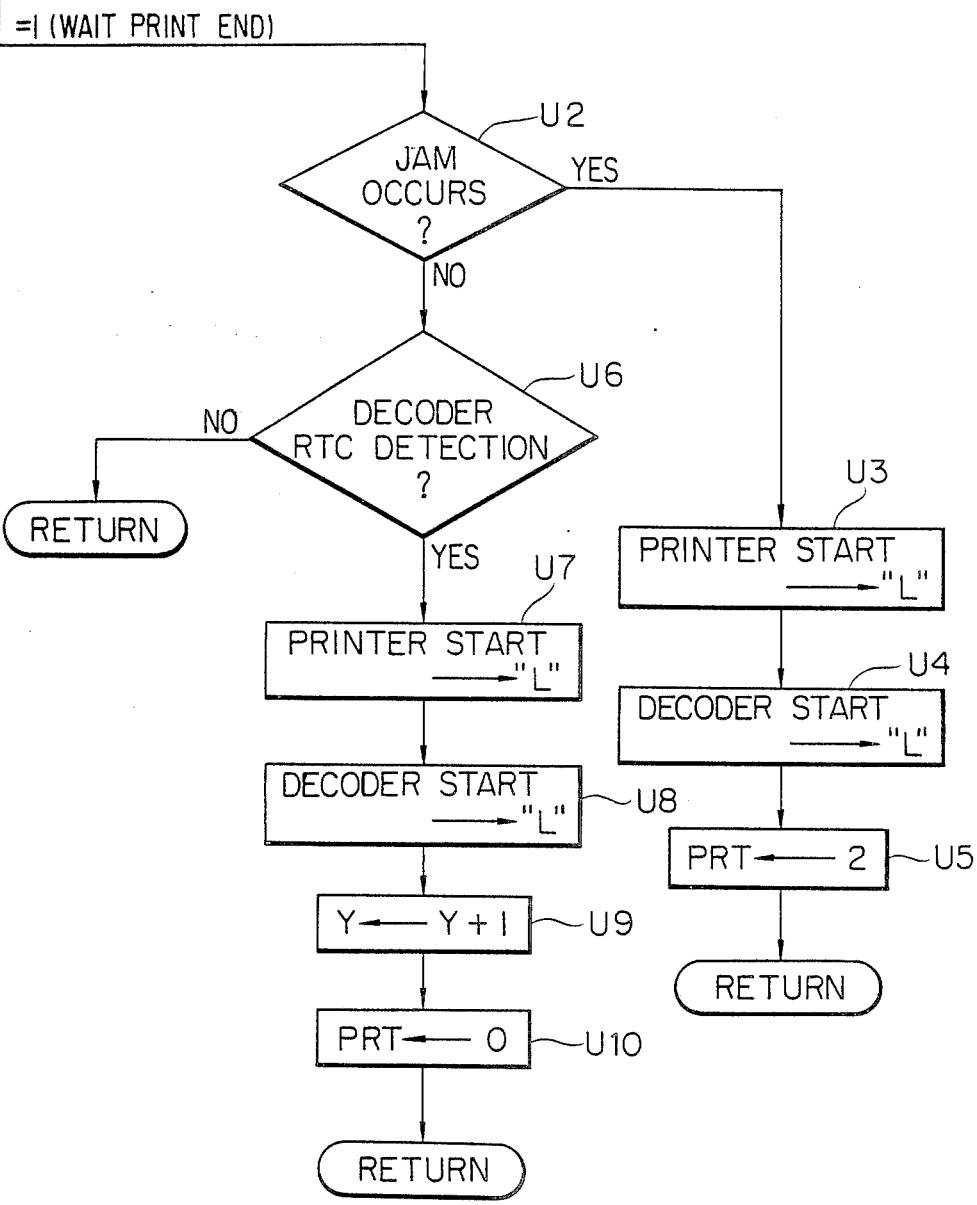

FIGS. 21 to 23 show flowcharts to explain the control operation.

FIG. 21 is the flowchart to explain the overall control operation. In step S1, the write start address is set to address 0. In step S2, the reception start page is set to X and this page is set to the first page.

In step S3, the record start page is set to Y and this page is set to page 1.

Subsequently, in steps S4 to S6, variables RCV, PRT, Z, etc. in the working area (variable storage area) in the RAM in the control section 55 are initialized. RCV is a flag indicative of the reception state; PRT is a flag representative of the state of the printer; and Z is a variable to store the write stop address. Steps S7 and S8 for the record control and print control which will be explained later are repeated and all of the control operations are finished.

On the other hand, FIG. 22 shows the record control step S7. In step T1, a check is made to see if the value of the flag RCV indicates "wait page reception" (RCV=0) or "wait page end" (RCV=1). In the case of "wait page end", if the receiver circuit detects the RTC signal in step T2, the page number X and the write start address are set into the accumulation control table in step T3. In the next step T4, the reception start page is increased by "1". The write stop address is sensed in step T5. The write stop address is set in the step T6. The value of the flag RCV is set to 0 in step T7 and the apparatus waits for the reception of the page and the processing routine is returned to the first step.

On the other hand, in the case of "wait page reception", when the receiver circuit detects the EOL signal in step T8, the apparatus is set into the state of "wait page end: by setting the flag RCV to "1" in step T9 and the processing routine is returned to the first step.

FIG. 23 is the flowchart to explain the practical method of the print control step S8. In step U1, a check is made to see if the value of the flag PRT indicates "wait print end" (PRT=1), or "wait print" (PRT=0), or jam occurs" (PRT=2).

In the case of "wait print end", a check is made to see if the jam occurs or not in step U2.

If the jam occurs, in step U3, the printer start signal is set at a low level. The decode start signal is set at a low level in step U4. The flag PRT is set to 2 in step U5 to set the apparatus into the state whereby the jam occurs. Then the processing routine is returned to the first step.

On the contrary, if it is determined that no jam occurs in step U2, step U6 follows and a check is made to see if a signal indicative of the detection of the RTC signal is generated from the decoder or not. If it is generated, the printer start signal is set at a low level in step U7 and the decode start signal is set at a low level in step U8, the record start page in the RAM in the control section 55 is increased by "+1" in step U9, and the flag PRT is set to 0 in step U10 to set the apparatus into the state of "wait print". Then, the processing routine is returned to the first step.

On the other hand, in the case of "wait print" in step U1, a check is made to see if the Y page is set in the accumulation control table or not in step U11. Unless the Y page is set, the processing routine is returned to the first step. If it is set, the write start address of the Y page is set as a readout start address in step U12, the printer start signal is set at a high level in step U13, the decode start signal is set at a high level in step U14, and the flag PRT is set to 1 in step U15 to set the apparatus into the state of "wait print end". Then, the processing routine is returned to the first step.

In the other cases than the foregoing cases, the processing routine advances from step U1 to step U16 and a check is made to see if the jam is recovered or not. If it is not recovered, the first step follows. If the jam is recovered, the flag PRT is set to 0 to set the apparatus into the state of "jam occurs" and the processing routine is returned to the first step.

Figure 24:
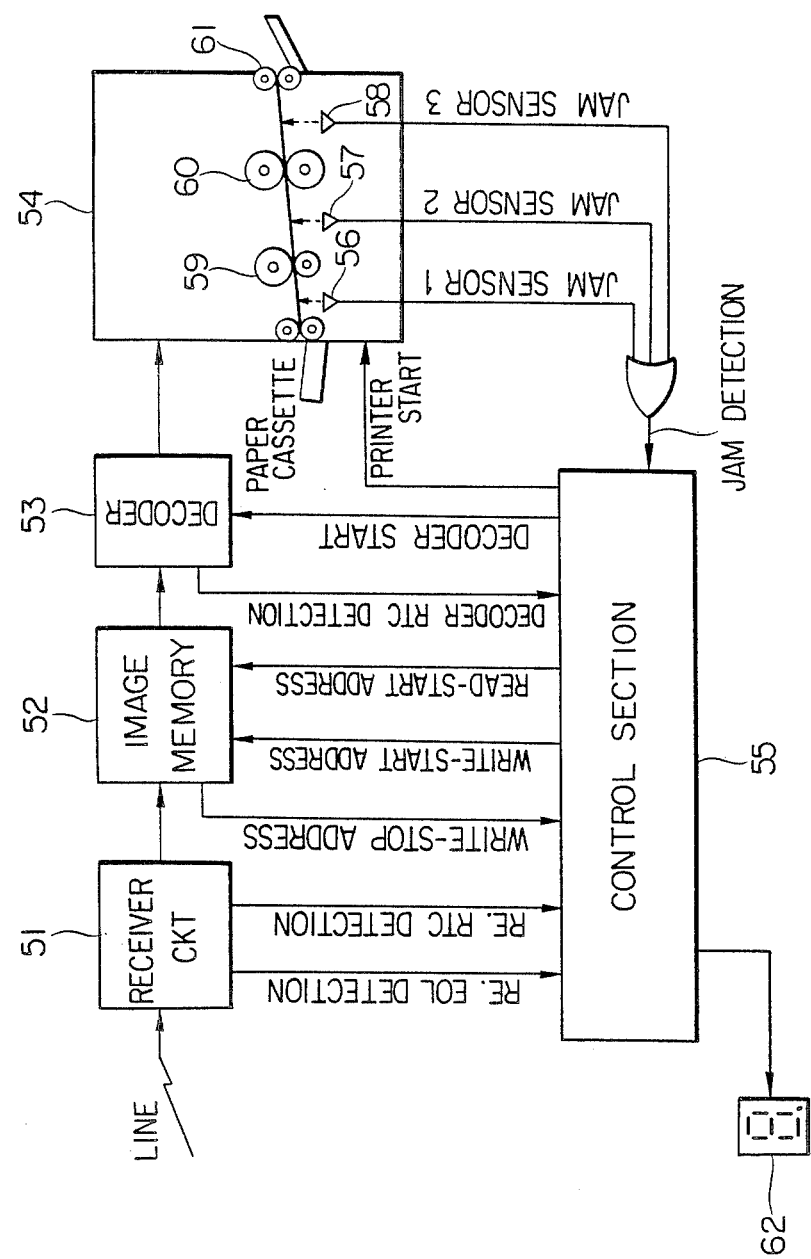
Figure 25A:
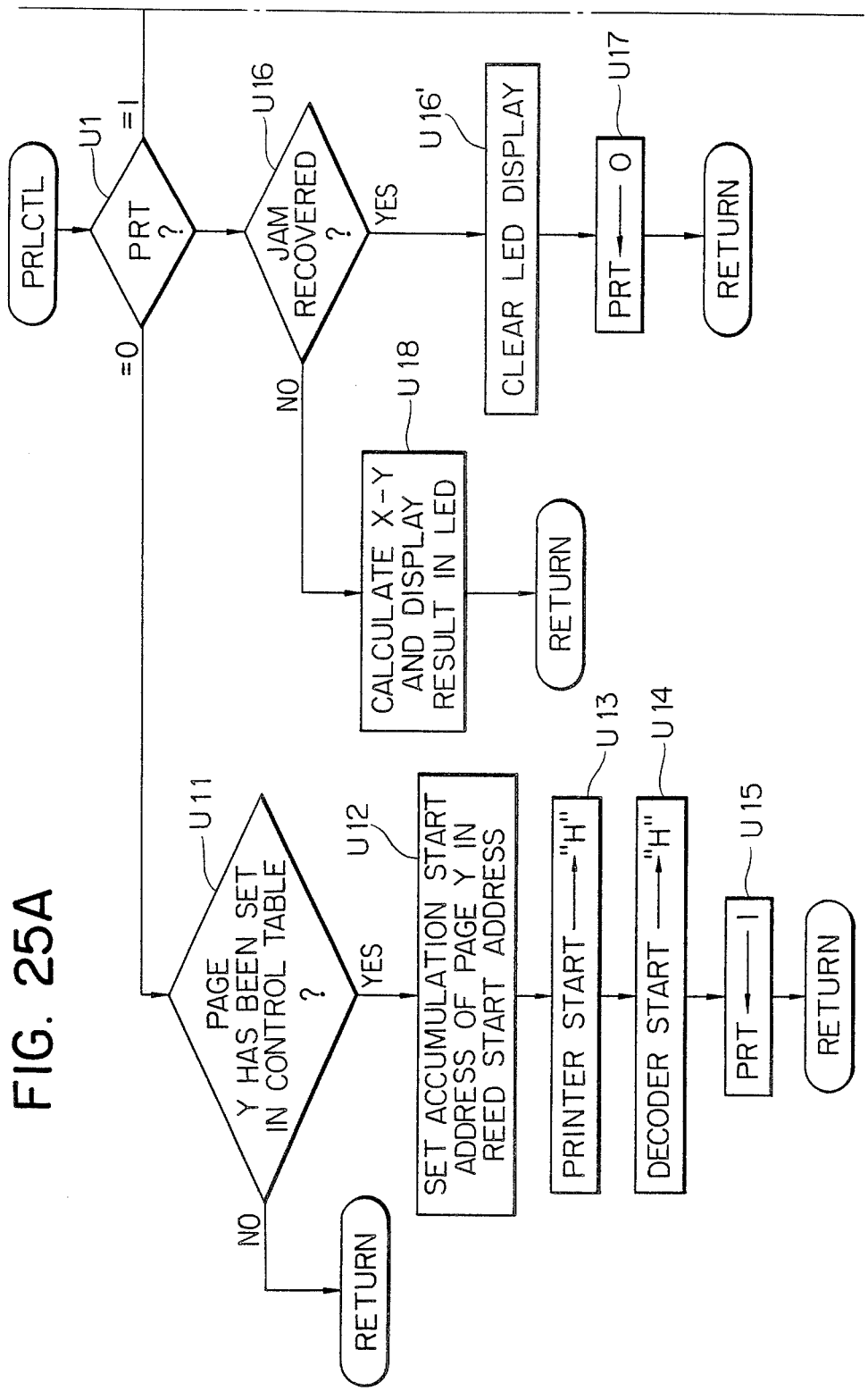
Figure 26:
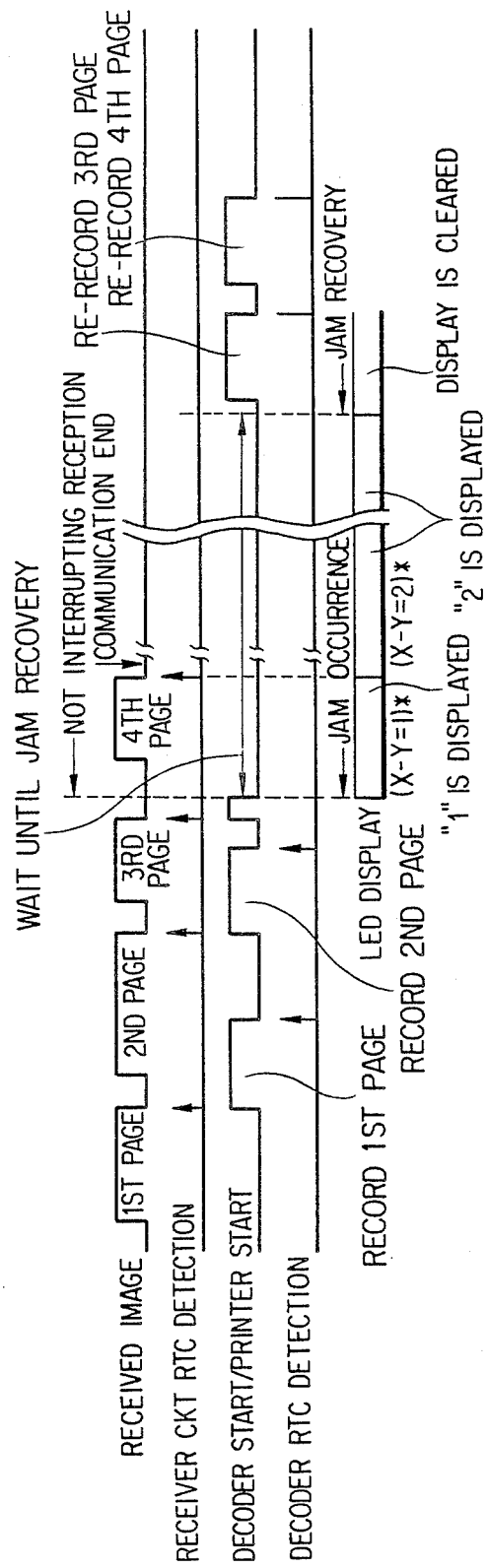

FIGS. 24 to 26 are diagrams to explain another embodiment of the present invention, in which the same and similar parts as those shown in FIGS. 14 to 23 are designated by the same reference numerals and their descriptions are omitted.

This embodiment adopts an arrangement such that when the jam of the recording paper occurs, the number of received pages which are not recorded nor outputted is displayed.

In the embodiment, a display device 62 consisting of an LED of seven segments is provided as display means and is connected to the control section 55.

It is apparent that any other display means may be used.

With such an arrangement, after the operator recovered the jam, he can determine at least how many residual recording papers are needed to record and reproduce all of the pages which are not recorded nor reproduced. Therefore, this arrangement is extremely convenient in operation.

A change of the control operation with such an arrangement is shown in FIG. 25.

FIG. 25 differs from FIG. 23 with respect to the following points. Namely, step U2' is added between steps U2 and U3. The difference between the value of the page to be printed next and the value of the page printed immediately before is displayed. Step U16' is added between steps U16 and U17. The display of the LED indicative of the number of residual pages is cleared. Step U18 is added to display the number of residual pages in the case where the jam is not recovered in step U16.

FIG. 26 shows a timing chart of this embodiment including the step of displaying the number of residual pages as well. Namely, FIG. 26 shows the case where the image data until the third page has been received and when the image data of the third page is being recorded, the jam occurs. The display device 62 displays $X-Y=3-2=1$ until the end of reception of the fourth page. After completion of the reception of the fourth page, $X-Y=4-2=2$ is displayed.

This embodiment can be also applied to an error of the printer such as a lack of toner or the like as well as the jam.

Although the foregoing respective embodiments have been described with regard to the facsimile apparatus, the invention can be also applied to any other image processing apparatuses having the communicating function.

The present invention is not limited to the foregoing embodiments but many modifications and variations are possible within the spirit and scope of the appended claims of the invention.

What is claimed is:

1. A facsimile apparatus comprising:
   communicating means for transmitting and receiving image data;
   memory means for storing image data which is received by said communicating means and which corresponds to a plurality of pages;
   recording means for recording image data received by said communicating means on a recording material;
   detecting means for detecting an abnormality in said recording means; and
   display means for displaying data associated with the number of pages of image data that has been recorded from among the image data stored in said memory means when the abnormality in said recording means is detected.

2. An image processing apparatus according to claim 1, wherein said display means displays the number of image data not yet recorded from among the image data stored in said memory means.

3. An image processing apparatus according to claim 1, wherein said detecting means detects an abnormality in the feeding of recording material to said recording means.

4. An image processing apparatus according to claim 1, wherein image data is continuously received by said communicating means even if said detecting means detects the abnormality.

5. An image processing apparatus according to claim 1, further comprising control means for controlling a read-starting address of said memory means when said detecting means detects the abnormality.

6. An image processing apparatus according to claim 1, wherein recording by said recording means is interrupted upon detection of the abnormality in said recording means and is restarted, to record image data stored in said memory means, upon resolution of the abnormality in said recording means.

7. An image processing apparatus comprising:
receiving means for receiving transmitted image data;
memory means for storing the image data received by said receiving means, said memory means for storing image data for at least one page of an image;
recording means for recording an image on a recording medium;
reading means for reading an image of an original;
copying means for copying the image of the original read by said reading means, said copying means utilizing said recording means; and
checking means for checking for an error in the received image data;
wherein when the image data is received during a copy operation, said checking means checks for an error in the image data while storing the image data in said memory means, and wherein after the completion of the copy operation, the received image data is recorded.

8. An image processing apparatus according to claim 7, wherein the received image data is encoded and said checking means includes decoding means for decoding the encoded data.

9. An image processing apparatus according to claim 8, wherein said checking means checks for an error in accordance with the amount of decoded data.

10. An image processing apparatus according to claim 7, wherein said recording means may be rendered unable to record received image data because said recording means is not provided with recording medium.

11. An image processing apparatus according to claim 7, wherein said recording means may be rendered unable to record received image data because a feeding malfunction of recording medium has occurred in said recording means.

12. An image processing apparatus according to claim 7, wherein, when said checking means has detected an error in the received image data, a signal indicating that an error occurred is output to transmitting means.

13. An image processing apparatus comprising:
receiving means for receiving transmitted encoded image data;
memory means for storing the image data received by said receiving means, said memory means for storing said image data for at least one page of an image;
decoding means for decoding the received image data;
recording means for recording the image data decoded by said decoding means on a recording material; and
checking means for checking for an error in the received image data by said decoding means, wherein said checking means includes both a mode in which the received image data is checked for an error while the received image data is stored into said memory means and a mode in which the received image data is checked for an error while the received image data is recorded on the recording material.

14. An image processing apparatus according to claim 13, wherein said decoding means is capable of detecting an error in the received image data while decoding the received image data.

15. An image processing apparatus according to claim 14, wherein said decoding means detects an error in accordance with the amount of decoded image data.

16. An image processing apparatus according to claim 15, wherein, when decoding means has detected an error in the received image data, a signal indicating that an error occurred is output to transmitting means.

17. An image processing apparatus according to claim 13, wherein stored image data is decoded after having been read from said memory means.

18. An image processing apparatus comprising:
receiving means for receiving transmitted image data;
memory means for storing image data received by said receiving means, said memory means for storing said image data for at least one page of an image;
recording means for recording an image from the received image data on a recording medium; and
checking means for checking for an error in the received image data;
wherein said checking means includes both a mode in which said checking means operates independently of an operation of said recording means and a mode in which said checking means operates in accordance with an operation of said recording means.

19. An image processing apparatus according to claim 18, wherein the received image data is encoded and said checking means includes decoding means for decoding the encoded data.

20. An image processing apparatus according to claim 19, wherein said checking means checks for an error in accordance with the amount of decoded data.

21. An image processing apparatus according to claim 18, wherein said checking means is actuated in the event that said recording means is unable to record received image data.

22. An image processing apparatus according to claim 21, wherein said recording means may be rendered unable to record received image data because said recording means is recording image data different from the received image data.

23. An image processing apparatus according to claim 21, wherein said recording means may be rendered unable to record received image data because said recording means is not provided with recording medium.

24. An image processing apparatus according to claim 21, wherein said recording means may be rendered unable to record received image data because a feeding malfunction of recording medium has occurred in said recording means.

25. An image processing apparatus according to claim 18, further comprising reading means for reading an original image, wherein image data differing from received image data comprises the original image read by said reading means.

26. An image processing apparatus according to claim 18, wherein, when said checking means has detected an error in the received image data, a signal indicating that an error has occurred is output to transmitting means.

27. An image processing apparatus according to claim 18, wherein, when said checking means has not detected an error in the received image data, said recording means starts to record the received image data after said recording means has been set to record image data.

28. A facsimile apparatus comprising:
receiving means for receiving encoded image data;
memory means for storing the image data received by said receiving means therein, wherein said memory means is capable of storing a plurality of pages of image data;
decoding means for reading out and decoding the image data stored in said memory means;
recording means for recording on a recording material the image data decoded by said decoding means; and
checking means for checking for an error in said stored image data with decoding means, in parallel with the operation of said recording means.

* * * * *

UNITED STATES PATENT AND TRADEMARK OFFICE
CERTIFICATE OF CORRECTION

PATENT NO. : 4,970,599

DATED : November 13, 1990

INVENTOR(S) : Hiroshi Nobuta

It is certified that error appears in the above-identified patent and that said Letters Patent is hereby corrected as shown below:

ON THE TITLE PAGE,

[30] Foreign Application Priority Data:

"Oct. 2, 1984 [JP] Japan .... 205628" should read
--Oct. 2, 1984 [JP] Japan .... 59-205628--.

[57] ABSTRACT:

Line 11, "the" should be deleted.

COLUMN 1:

Line 32, "apparatuses," should read --apparatuses--.

Line 49, "which is" should be deleted.

COLUMN 2:

Line 48, "overall" should read --overall operation--.

Line 58, "the pro-" should read --the communication pro- --.

COLUMN 3:

Line 43, "consisting" should read --comprising--.

UNITED STATES PATENT AND TRADEMARK OFFICE
CERTIFICATE OF CORRECTION

PATENT NO. : 4,970,599

DATED : November 13, 1990

INVENTOR(S) : Hiroshi Nobuta

It is certified that error appears in the above-identified patent and that said Letters Patent is hereby corrected as shown below:

COLUMN 4:

Line 32, "signal 34.," should read --signal 34.--.

COLUMN 5:

Line 52, "this  ," should read --this,--.

COLUMN 6:

Line 60, "a" should be deleted.

COLUMN 8:

Line 58, "recroding" should read --recording--.

COLUMN 11:

Line 66, "accumualted" should read --accumulated--.

UNITED STATES PATENT AND TRADEMARK OFFICE
CERTIFICATE OF CORRECTION

PATENT NO. : 4,970,599

DATED : November 13, 1990

INVENTOR(S) : Hiroshi Nobuta

It is certified that error appears in the above-identified patent and that said Letters Patent is hereby corrected as shown below:

COLUMN 14:

Line 51, "An image processing apparatus" should read --A facsimile apparatus--.

Line 55, "An image processing apparatus" should read --A facsimile apparatus--.

Line 59, "An image processing apparatus" should read --A facsimile apparatus--.

Line 63, "An image processing apparatus" should read --A facsimile apparatus--.

Line 67, "An image processing apparatus" should read --A facsimile apparatus--.

UNITED STATES PATENT AND TRADEMARK OFFICE
CERTIFICATE OF CORRECTION

PATENT NO. : 4,970,599

DATED : November 13, 1990

INVENTOR(S) : Hiroshi Nobuta

It is certified that error appears in the above-identified patent and that said Letters Patent is hereby corrected as shown below:

COLUMN 16:

Line 7, "decoding means" should read --said decoding means--.

Signed and Sealed this

Twenty-fifth Day of August, 1992

Attest:

DOUGLAS B. COMER

Attesting Officer

Acting Commissioner of Patents and Trademarks